United States Patent [19]

Jen et al.

[11] Patent Number: 5,162,473
[45] Date of Patent: * Nov. 10, 1992

[54] NEUTRAL AND ELECTRICALLY CONDUCTIVE POLY(HETEROCYCLIC VINYLENES) AND PROCESSES FOR PREPARING SAME

[75] Inventors: Kwan-Yue A. Jen, Flanders; Ronald L. Elsenbaumer, Morristown; Lawrence W. Shacklette, Maplewood, all of N.J.

[73] Assignee: Allied-Signal, Morris Township, Morris County, N.J.

[*] Notice: The portion of the term of this patent subsequent to Oct. 2, 2009 has been disclaimed.

[21] Appl. No.: 70,464

[22] Filed: Jul. 7, 1987

Related U.S. Application Data

[63] Continuation-in-part of Ser. No. 894,172, Aug. 7, 1986.

[51] Int. Cl.$^5$ .............................................. C08F 24/00
[52] U.S. Cl. .................................... 526/286; 526/256; 526/258; 526/270; 526/275; 528/403; 548/541; 549/480
[58] Field of Search ................... 252/500, 512, 518; 526/270, 257, 240, 72, 256, 258, 275, 286; 528/403; 548/541; 549/480

[56] References Cited

U.S. PATENT DOCUMENTS 3,686,141  9/1972  Bracke ................... 526/270
4,808,681  2/1989  Harper et al. .......... 526/270

FOREIGN PATENT DOCUMENTS 0182548  5/1986  European Pat. Off.

Primary Examiner—Mark L. Bell
Assistant Examiner—C. M. Bonner
Attorney, Agent, or Firm—R. C. Stewart, II; G. H. Fuchs; E. D. Buff

[57] ABSTRACT

This invention relates to electrically conductive and non-conductive forms of poly(heterocyclic vinylenes) and to solutions of same. Another aspect of this invention relates to novel precursor polymers which can be converted into the poly(heterocyclic vinylenes) of this invention.

46 Claims, 2 Drawing Sheets

NEUTRAL AND ELECTRICALLY CONDUCTIVE POLY(HETEROCYCLIC VINYLENES) AND PROCESSES FOR PREPARING SAME

RELATED APPLICATIONS

This application is a continuation-in-part application of U.S. patent application Ser. No. 894,172, filed Aug. 7, 1986 pending.

BACKGROUND OF THE INVENTION

1. Field of the Invention

This invention relates to novel electrically conductive forms of poly(heterocyclic vinylenes), especially poly(thiophene vinylenes) or equivalently, poly(2,5-thienylene vinylenes), and to solutions comprising poly(heterocyclic vinylenes) either in the conductive form or non-conductive form. Another aspect of this invention relates to a method of using the solution of this invention to form conducting polymer articles, including films, fibers, and coatings and methods of using such solutions as conducting liquids. Yet another aspect of this invention relates to novel process for preparing the poly(heterocyclic vinylenes) of this invention.

2. Prior Art

There has recently been an increased interest in the electrical conductivity of polymeric systems. For example, U.S. Pat. Nos. 4,321,114 and 4,442,187 are directed to conjugated polymers having conjugation in all or a part of at least one backbone chain thereof such as polyacetylene, polyphenylene, and poly(phenylene sulfide). It has recently been discovered that these conjugated backbone polymers can be chemically doped in a controlled manner with electron acceptor and/or electron donor dopants to produce electrically conducting polymers. Doping procedures and certain representative doped polymers are described in U.S. Pat. Nos. 4,222,903 and 4,204,216.

In the general field of conducting polymers, it is believed very difficult to dope one of these conjugated backbone polymers to the extent that it becomes a good conductor ($10^{-3} - 100$ ohm$^{-1}$cm$^{-1}$) and thereafter dissolve the polymer in any solvent-system. U.S Pat. Nos. 4,452,727 and 4,599,194 disclose novel polymer solutions containing a doped sulfur-containing or oxygen-containing aromatic polymer. The solvent of this solution is restricted to solvents containing Lewis Acid halides having a liquid phase under atmospheric pressure for at least one temperature between $-150°$ C. and $+100°$ C., such as arsenic trifluoride, phosphorus trifluoride, phosphorous pentafluoride, phosphorus trichloride, boron trifluoride and the like. These solutions can be used to form articles, as for example, by casting the solution onto a substrate, and removing the solvent. This solution and method represents a significant advancement over the art; however, it does suffer from certain economic and practical disadvantages resulting from the cost and high environmental reactivity and toxicity of the specific solvents which must be used.

A few conductive species of polyalkylthiophenes are known, having been primarily prepared by electrochemical polymerization. Illustrative of such species are poly(3-methylthiophene) and poly(3,4-dimethylthiophene). R. J. Waltman, J. Bargon, and A. F. Diaz, *J. Phys Chem.*, 1983, 87, 1459-1463. G. Tourillon, D. Govrier, P. Garnier, and D. Viven, *J. Phys. Chem.*, 1984 88, 1049-1051. S. Hotta, T. Hosaka, and W. Shimotsuma, *Syn. Metals.* 1983, 6, 317-318. However, the polymers prepared electrochemically are not soluble in common organic solvents such as acetonitrile, propylene carbonate, tetrahydrofuran, dichloromethane, dimethyl formamide, nitrobenzene, nitropropane, toluene, and the like. In the absence of solutions, or plasticized forms, the ability to economically fabricate articles out of the conducting forms of these poly(alkylthiophenes), especially semi-conducting and conducting polymer films, fibers, and coatings, especially using conventional solvents or melt-forming techniques, is greatly restricted. In fact, the electrochemical methods are reported to give homogeneous conductive polymer films only up to film thickness of about 2000 Å. Powdery deposits are obtained when attempts are made to grow films thicker than this. (G. Tourillon and F. Garnier, *J. Poly. Sci. Poly. Phys. Ed.*, 1984, 22, 33-39.)

The unsubstituted polythiophenes form highly conductive complexes on doping which are not stable in normal environments (containing air or water vapor). However, electrochemically prepared conductive poly(3-methylthiophene) is environmentally stable. (G. Tourillon and F. Garnier, *J. Electrochem. Soc., Electrochem. Sci, Techn.* 1983, 130, 2042-3.

A few conductive oligomeric species of poly(thiophene vinylenes), i.e., 6 to 8 repeat units, are known. For example, such materials are described in Kossmehl, G. et al., *Makromol Chem.*, V. 131, pp. 15-54 (1970), and Kossmehl G., *Ber. Bunsenges Phys. Chem.*, 83, pp. 417-426 (1979). These oligomeric species of poly(thiophene vinylenes) exhibit several undesirable properties, which limit their utility in potential applications such as EMI shielding, and as anti-static materials. For example, the above-cited publications disclose that these oligomeric poly(thiophene vinylenes) are insoluble in common organic solvents which essentially precludes solution processability, are infuseable which essentially precludes melt processability, and exhibit low conductivities ($10^{-1} - 10^{-2}$ ohm$^{-1}$cm$^{-1}$) which essentially precludes use of such materials in EMI shielding and circuitry applications.

Thus, there is a need for economically attractive techniques to facilitate the production of conductive and semi-conducting forms of environmentally stable poly(heterocyclic vinylenes), such as poly(thiophene vinylene) polymers and copolymers, on an industrially important scale, to facilitate the doping process, and especially, to develop processing techniques to form shaped articles such as films, fibers and coatings of semi-conducting and conducting species of poly (heterocyclic vinylenes).

SUMMARY OF THE INVENTION

One embodiment of this invention relates to soluble and processible precursor homopolymers or random or block copolymers which are useful in the formation of poly(heterocyclic vinylenes), said polymers having regular or random recurring units of the formulas I to VII:

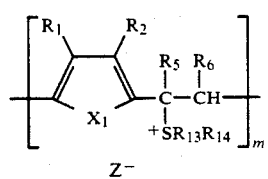 I

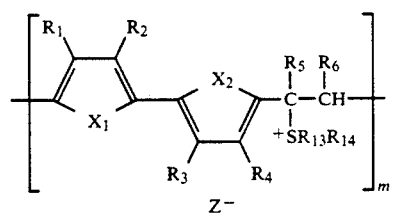 II

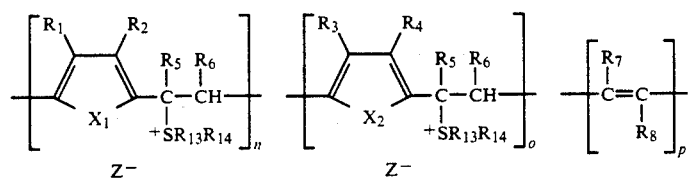 III

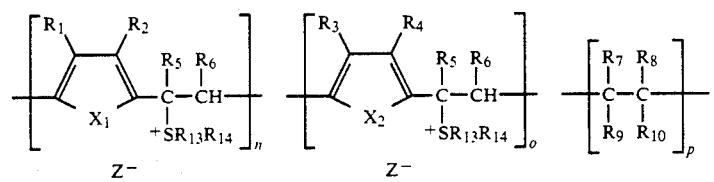 IV

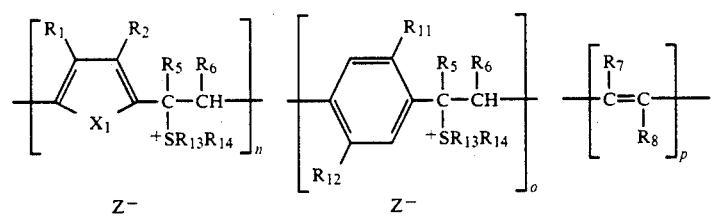 V

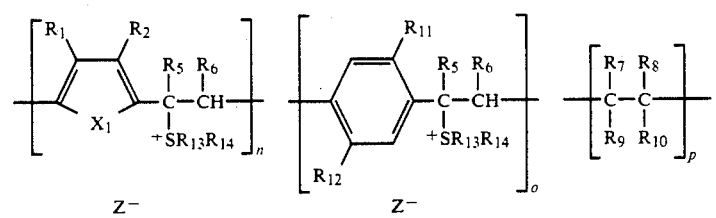 VI

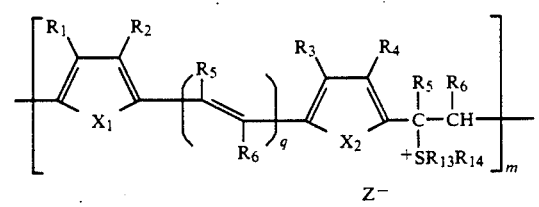 VII wherein:
m, and the sum of n,o and p are the same or different and are integers at least about 100 with the proviso that at least one of n or o is greater than zero;
q is an integer which can range from 0 to about 4;
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different at each occurence and are hydrogen or isotopes thereof, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylamino, diarylamino, alkylamino, dialkylamino, phosphoric acid, alkylarylamino, arylthio, heteroaryl, arylsulfinyl, alkoxycarbonyl, arylsulfonyl, carboxylic acid, halogen, nitro, cyano, sulfonic acid, or alkyl or phenyl substituted with one or more of sulfonic acid, phosphoric acid, carboxylic acid, halo, amino, nitro, cyano or epoxy moieties, or a moiety of the formula:

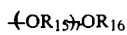

wherein:

$R_{15}$ is a divalent alkylene moiety having from 1 to about 7 carbon atoms;

$R_{16}$ is alkyl having from 1 to about 7 carbon atoms; and r is a natural number from 1 to about 50; or $R_1$ and $R_2$, or $R_3$ and $R_4$, or $R_5$ and $R_6$, or $R_7$ and $R_8$, or $R_9$ and $R_{10}$ or $R_{11}$ and $R_{12}$ or $R_{13}$ and $R_{14}$ or $R_{15}$ and $R_{16}$ substituents taken together are an alkylene or alkenylene group completing a 3, 4, 5, 6 or 7 membered aromatic or alicyclic carbon ring, which ring may optionally include one or more divalent heteroatoms of nitrogen, sulfur, sulfinyl, sulfonyl or oxygen;

$Z^-$ is an anion; and $X_1$ and $X_2$ are the same or different and are S, O, Se, $NR_{17}$, or $PR_{17}$, wherein $R_{17}$ is hydrogen, alkylaryl, arylalkyl, alkyl or aryl.

This invention also relates to solutions of the polymers of Formulas I to VII in protic or aprotic solvents. These solutions can be used to form films of the polymers of Formula I to VII which upon subsequent heat treatment, or treatment with base, form the corresponding conjugated polymers of Formulas VIII to XIV described below which said conjugated polymer can be converted into a electrically conductive polymer merely by treatment with p-type or n-type dopants as commonly used in the art.

Another aspect of this invention relates to doped (conductive) and undoped (non-conductive) poly(-heterocyclic vinylene) random or block copolymers and homopolymers having regular or random recurring units of the formula VIII to XIV.

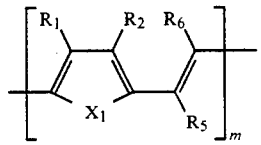

VIII

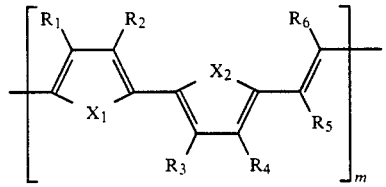

IX

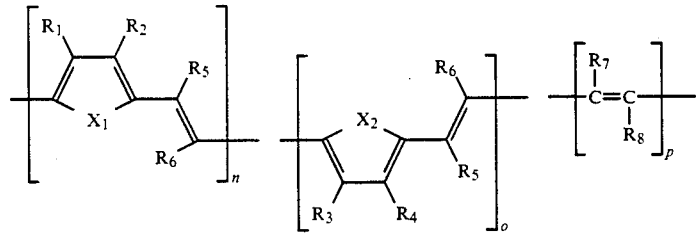

X

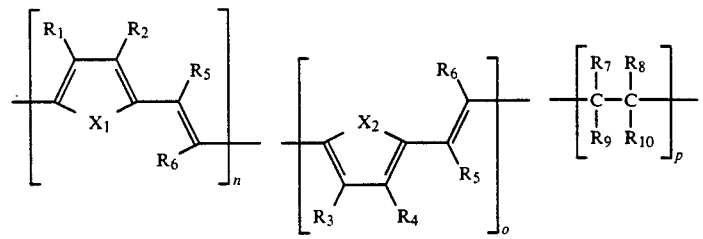

XI

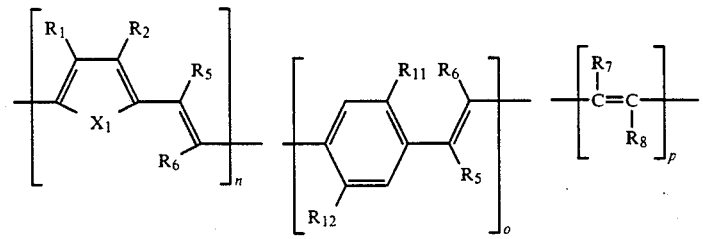

XII

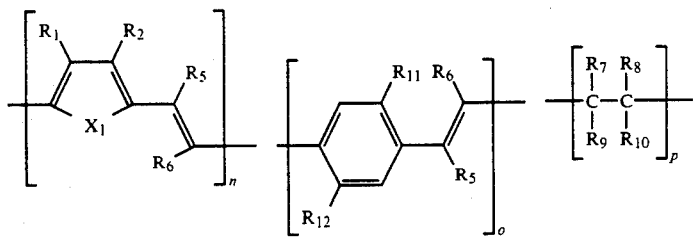

XIII

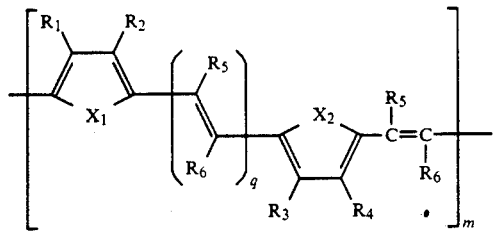

XIV wherein m, n, o, p, q, $X_1$, $X_2$, $R_1$, $R_2$, $R_3$, $R_4$, $R_5$, $R_6$, $R_7$, $R_8$, $R_9$, $R_{10}$, $R_{11}$, $R_{12}$, $R_{15}$, $R_{16}$ and $R_{17}$ are as described above.

Another aspect of this invention relates to a solution which comprises:
(a) an aqueous or organic solvent; and
(b) one or more forms of the copolymers and homopolymers of Formulas I, II, III, IV, V, VI, VII, VIII, IX, X, XI, XII, XIII and XIV. Still another aspect of this invention relates to solutions of the copolymers and homopolymers of Formulas VIII to XIV which further comprise a dopant solute.

Solutions of Formulas I to VII can be conveniently used to form conductive articles by first removing the solvent, then heating to eliminate $R_{13}$ $R_{14}S$ and HZ, thereby producing polymers of Formulas VIII to XIV (neutral, undoped) which, through the use of an electron-acceptor dopant, form an electrically conductive article. Solutions of the copolymers and homopolymers of Formulas VIII to XIV in which the polymer is neutral and soluble can also be conveniently used to form conductive articles by removing the solvent until the neutral polymer solidifies, and thereafter doping the solidified neutral polymer through use of a suitable electron-acceptor dopant to form an article composed of an electrically conductive or semiconductive form of said homopolymer or copolymer. In addition, solutions of the polymers of Formulas VIII to XIV which include a dopant solute can be used to form conductive articles merely by removing the solvent until the doped polymer solidifies.

The use of the solutions of this invention in the methods of this invention provides conductive articles of all shapes, as for example, films and fibers which are air stable, free standing and flexible.

DETAILED DESCRIPTION OF THE INVENTION

Figure 1:
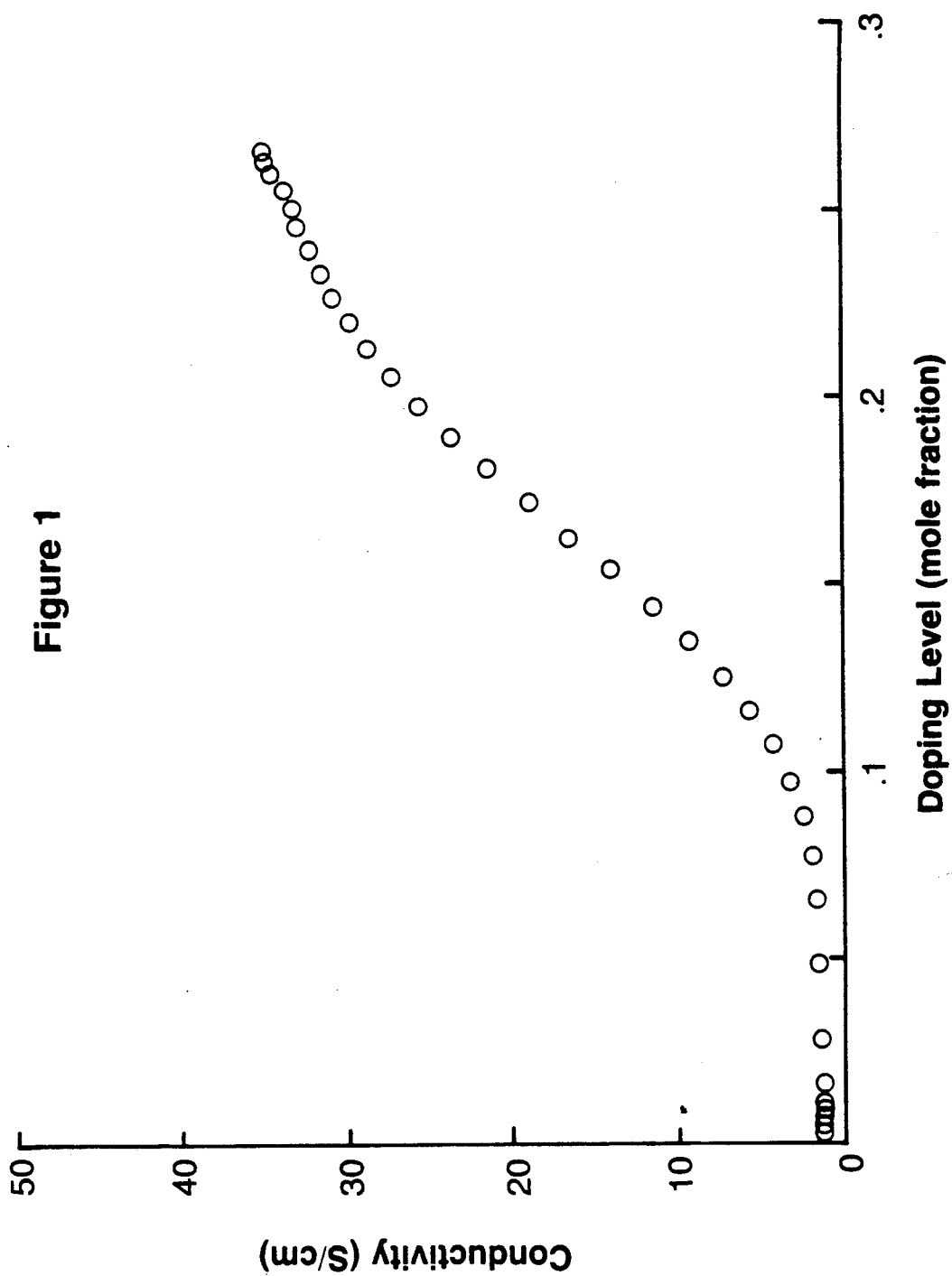
FIG. 1 is a graph of the in situ conductivity measurements for doped poly(thiophene vinylene) (vertical axis) as a function of doping level (mole fraction per monomeric repeat unit (horizontal axis).
Figure 2:
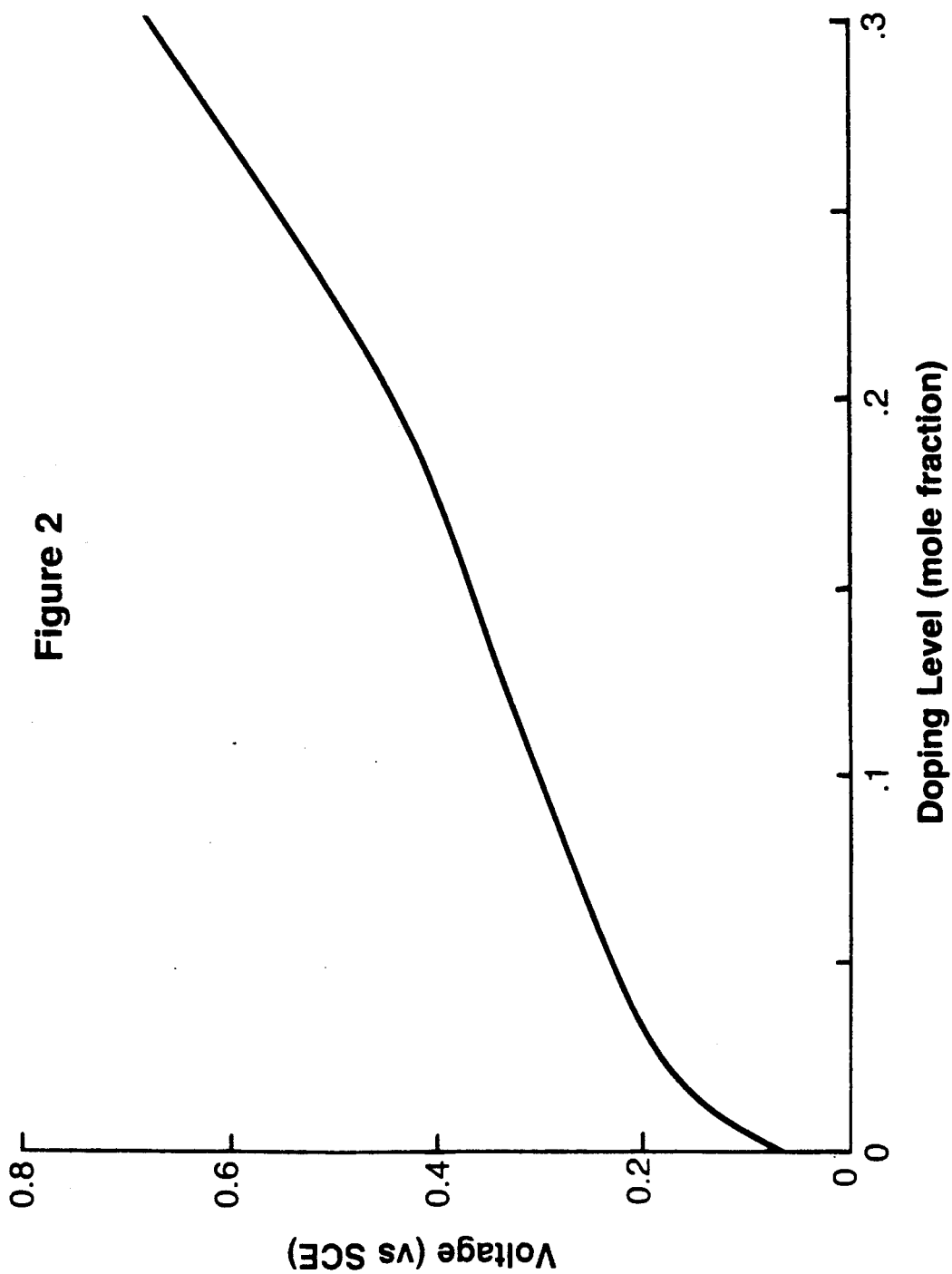
FIG. 2 is a graph of the in situ voltage measurement of poly (thiophene vinylene) (vertical axis) as a function of doping level (horizontal axis).

One aspect of this invention is a homopolymer or a random or block copolymer according to Formula I to VII, wherein o, q, p, n, m, $R_1$, $R_2$, $R_3$, $R_4$, $R_5$, $R_6$, $R_7$, $R_8$, $R_9$ $R_{10}$, $R_{11}$, $R_{12}$, $R_{13}$, $R_{14}$, $R_{15}$, $R_{16}$, $R_{17}$, $Z^-$, $X_1$ and $X_2$ are as described above.

Illustrative of useful $R_1$, $R_2$, $R_3$, $R_4$, $R_5$, $R_6$, $R_7$, $R_8$, $R_9$, $R_{10}$, $R_{11}$, and $R_{12}$ groups are hydrogen; cyano; nitro; halo; alkyl such as methyl, ethyl, butyl, pentyl, octyl, nonyl, tert-butyl, neopentyl, isopropyl, sec-butyl, dodecyl and the like, alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; cycloalkenyl such as cyclohexenyl, cyclopentenyl and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; alkyl amino and dialkylamino such as dimethylamino, methylamino, diethylamino, ethylamino, dibutylamino, butylamino and the like; cycloalkyl such as cyclohexyl, cyclopentyl, cyclooctyl, cycloheptanyl and the like; alkoxyalkyl such as methoxymethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxy-butyl, cyanomethyl, 3-chloropropyl, 4-nitrophenyl,3-cyanophenyl, 1-hydroxymethyl, and the like; sulfonic acid terminated alkyl and aryl groups; carboxylic acid and phosphoric acid terminated alkyl and aryl groups such as ethylsulfonic acid, propylsulfonic acid, butylsulfonic acid, phenylsulfonic acid, and the corresponding carboxylic acids. Exemplary of other useful $R_1$ to $R_{12}$ groups are moieties of the formula:

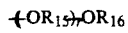

where r, $R_{15}$ and $R_{16}$ are as described above. Useful $R_{15}$ groups include divalent moieties of the formulas $-(CH_2)_2-$, $-(CH_2)_3-$, $-(CH_2)_4$ and $-CH_2CH(CH_3)-$, and useful $R_{16}$ groups include $-CH_3$, and $-CH_2CH_3$. Illustrative of substituents having such $R_{15}$ and $R_{16}$ are ethyleneglycol monomethylether, diethylene glycol monomethylether, triethylene glycol monomethylether, tetraethylene glycol monomethylether, and the like.

Illustrative of useful $R_{13}$ and $R_{14}$ groups are methyl, ethyl, propyl, butyl, or $R_{13}$ and $R_{14}$ together may form a cyclic ring such as $-(CH_2)_x$ wherein x is an integer from 3 to 7 as, for example, $-(CH_2)_4$ $-(CH_2)_3$,C $-(CH_2)_5$, $-(CH_2)_6$ the like, and aryl structures of the formula:

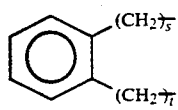

wherein s and t are the same or different and are integers of from 1 to about 3.

Illustrative of $R_{17}$ groups are hydrogen, methyl, ethyl, propyl, hexyl, octyl, nonyl, phenyl, benzyl, phenyl, phenethyl, phenylpropyl, 2,4-dimethylphenyl, 4-methylphenyl and the like.

The nature of $Z^-$ groups is not critical and $Z^-$ can be any anion. Illustrative of useful $Z^-$ groups are anions such as $BF_4^-$, $NO_3^-$, $F^-$, $Cl^-$, $Br^-$, $I^-$, $ClO_4^-$, $FeCl_4^-$, $CF_3CO_2^-$, $ClO_3^-$, $MoCl_6^-$, $MoOCl_4^-$, $FeCl_2^-$, $AlCl_4^-$, $KS_2O_8^-$, $BF_4^-$, $PF_6^-$, $SbF_6^-$, $NO_2^-$, $HSO_4^-$, $CF_3SO_3^-$, $CH_3SO_3^-$, $CH_3CO_2^-$, $CH_3C_6H_4SO_3$ and the like Preferred for use in the practice of this invention are homopolymers, and random or block copolymers of the above Formulas I-XIV in which:

m, and the sum of n,o,and p are natural numbers at least about 100, preferably at least about 300, with the proviso that n, o and p are selected such that the moles of each regular or random recurring moiety in the block or random copolymers of Formulas III, IV, V, VI, X, XI, XII, and XIII is at least about 1 mole% based on the total moles of recurring units;

q is an integer from 0 to about 4;

$R_1$, $R_2$, $R_3$ and $R_4$ are the same or different at each occurrence and are hydrogen or alkyl having from 1 to about 20 carbon atoms, such as ethyl, propyl, isopropyl, n-butyl, sec-butyl, isobutyl, n-pentyl, isopentyl, sec-pentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkoxy having from 1 to about 12 carbon atoms such as methoxy, ethoxy, and propoxy; alkanoyl having from 1 to 20 carbon atoms such as formyl, acetyl, and propinyl; alkylthio having from 1 to 20 carbon atoms such as methylthio, ethylthio, propylthio, dodecylthio and butylthio; alkoxyalkyl having from 1 to 20 carbon atoms such as methoxy methyl, ethoxy ethyl, heptoxy propyl, alkenyl having from 1 to about 20 carbon atoms such as allyl, vinyl and 3-butenyl; or phenyl and alkyl substituted with epoxy, sulfonic acid, nitro, cyano, phosphoric acid, carboxylic acid, or halo substituents such as trifluoromethyl, 3,4-epoxybutyl, cyanomethyl, 2-nitroethyl, 3-chloropropyl, 4-nitrophenyl, $-CH_2CH_2CH_2SO_3H$; $-CH_2CH_2CH_2P(O)(OH)_2$; and $-CH_2CH_2CH_2CO_2H$; moiety of the formula:

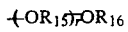

wherein
$R_{15}$ is alkyl having from 1 to about 4 carbon atoms;
$R_{16}$ alkyl having from 1 to about 4 carbon atoms; and
r is a natural number from 1 to about 25 such as ethylene glycol monomethylether, diethylene glycol monomethylether, triethylene glycol monomethylether, tetraethylene glycol monomethylether and the like; or any of $R_1$ and $R_2$ or $R_3$ and $R_4$ or $R_{15}$ and $R_{16}$, substituents taken together may form an alkylene or alkenylene chain having from 2 to 20 carbons atoms completing a 4, 5 or 6 membered ring system which may include one or more heteroatoms of oxygen, nitrogen or sulfur such as 1,4-butandiyl, 1,2-ethanediyl, $-CH_2SCH_2-$ $-CH_2OCH_2-$, $-CH_2CH_2-NH-CH_2-$, or $-CH_2CH_2-NH-$.

$R_5$ to $R_{14}$ are the same or different at each occurrence and are hydrogen, alkyl having from 1 to about 12 carbon atoms, substituted alkyl, phenyl, substituted phenyl, alkylthio having from 1 to about 12 carbon atoms or alkoxy having from 1 to about 12 carbon atoms; alkylamino having about 1 to about 12 carbon atoms or any of $R_5$ and $R_6$, or $R_7$ and $R_8$, or $R_9$ and $R_{10}$, or $R_{11}$ and $R_{12}$, or $R_{13}$ and $R_{14}$ substituents together may form an alkylene chain having 2 to about 20 carbon atoms completing a 4, 5 or 6 membered ring system which may include one or more heteroatoms of oxygen or sulfur such as 1,4-butandiyl, 1,2-ethanediyl, $-CH_2SCH_2-$ or $-CH_2OCH_2-$;

$Z^-$ is $F^-$, $ClO_4^-$, $ClO_3^-$, $KS_2O_8$, $BF_4^-$, $PF_6^-$, $SbF_6^-$, $Cl^-$, $Br^-$, $I^-$, $NO_3^-$, $CH_3SO_3^-$, $HSO_4^-$, $CF_3SO_3^-$, $CH_3CO_2^-$, and $CH_3C_6H_4SO_3^-$; and $X_1$ and $X_2$ are the same or different and are oxygen, sulfur or $-NR_{17}$ wherein $R_{17}$ is hydrogen or alkyl Particularly preferred for use in the paractice of this invention are homopolymers and random copolymers of the above-referenced Formula I to XIV wherein:

q is an integer from 0 to about 3;

m, and the sum of n, o and p are at least about 500 with the proviso that n, o and p are selected such that the moles of each recurring moiety of the random copolymers of Formulas III, IV, V, VI, X, XI, XII, and XIII are at least about 5 mole % based on the total moles of recurring units in said random copolymer;

$R_1$, $R_2$, $R_3$ and $R_4$ are the same or different at each occurrence and are hydrogen; alkyl having from 1 to about 12 carbon atoms such as ethyl, methyl, propyl, n-butyl, sec-butyl, n-hexyl, n-octyl, and n-dodecyl; phenyl; alkoxy having from 1 to about 12 carbon such as methoxy, nonoxy, dodecanoxy, ethoxy and propoxy; alkylthio having from 1 to about 12 carbon atoms such as methylthio, ethylthio, propylthio, and butylthio; alkoxyalkyl having from 1 to about 12 carbon atoms; or a moiety of the formula:

—(OR₁₅)ᵣOR₁₆ wherein:
R₁₅ is alkylene of about 2 to 3 carbon atoms;
R₁₆ is alkyl of from 1 to about 3 carbon atoms; and
r is a natural number from 1 to about 10;
R₅, R₆, R₇, R₈, R₉, R₁₀, R₁₁ and R₁₂ are the same or different at each occurrence and are hydrogen; alkyl, such as methyl, ethyl or the like; substituted alkyl such as butylsulfonic acid, propylsulfonic acid, cyanomethyl, epoxybutyl, pentafluoroethyl, nitropropyl, and butylcarboxylic acid; alkoxy such as methoxy, ethoxy, butoxy, and the like; and alkylthio such as methylthio, ethylthio and the like; or any of R₅ and R₆, R₇ and R₈, R₉ and R₁₀, or R₁₁ and R₁₂ together may be propylene, butylene or like divalent alkylene group forming an alicyclic ring;
$Z^-$ is $Cl^-$, $Br^-$, $BF_4^-$, $PF_6^-$, $NO_3^-$, $ClO_4^-$, $I^-$, $ClO_3^-$, $CH_3SO_3^-$, $KS_2O_8^-$, $SbF_6^-$, $HSO_4^-$, $CF_3SO_3-k$, $CH_3CO_2^-$, or $CH_3C_6H_4SO_3^-$;
X₁ and X₂ are the same or different and are oxygen or sulfur; and
R₁₃ and R₁₄ are the same or different at each occurrence and are alkyl or alkylene forming an alkylene ring.

Amongst these particularly preferred embodiments, most preferred are random copolymers and homopolymers of Formula I to XIV in which:
q is an integer from 0 to about 2;
m, or the sum of n, o, and p is at least about 1000 with the proviso that n, o and p are selected such that the total moles of each recurring moiety in said random copolymer of Formulas III, IV, V, VI, X, XI, XII and XIII is at least about 10 mole % based on the total moles of recurring units in said random copolymer;
R₁ to R₄ are the same or different at each occurrence and are hydrogen, or alkyl, alkoxy or alkoxyalkyl having 1 to about 12 carbon atoms or a moiety of the formula:

—(OR₁₅)ᵣOR₁₆ wherein:
R₁₅ is or —(CH₂)₂— or —CH₂CH(CH₃)—;
R₁₆ is —CH₃ or —CH₂CH₃; and
r is a natural number 1 to about 6;
R₅, R₆, R₇, R₈, R₉, R₁₀, R₁₁, and R₁₂ are the same or different at each occurrence and are hydrogen, alkyl, or any of R₅ and R₆, R₇ and R₈, R₉ and R₁₀, or R₁₁ and R₁₂ together may form a divalent alkylene group having from 2 to about 6 carbon atoms forming an alicyclic ring;
R₁₃ and R₁₄ are the same or different at each occurrence and are methyl, ethyl, butyl, —(CH₂)₆, —(CH₂)₄, —(CH₂)₃, —(CH₂)₅ or —(CH₂)₇;
$Z^-$ is $Cl^-$, $Br,^-$, $I^-$, $BF_4^-$, $PF_6^-$, $NO_3^-$, $ClO_4^-$, $ClO_3^-$, $CH_3CO_2^-$, $KS_2O_8^-$, $SbF_6^-$, $HSO_4^-$, $CF_3SO_3^-$, or $CH_3C_6H_4SO_3^-$; and
X₁ and X₂ are sulfur.

Especially good results have been obtained with homopolymers and random copolymers of the above referenced formulas VIII to XIV, and the corresponding precursors of the formulas I to VII, said homopolymers and copolymers selected from the group consisting of poly(thienylene vinylene), poly(furylene vinylene), poly(3-methoxythienylene vinylene), poly(3-ethoxythienylene), poly(3-ethylthienylene vinylene), poly(3-propylthienylene vinylene), poly(3-butylthienylene vinylene), random copolymers of thienylene vinylene and furylene vinylene, and random copolymers of thienylene vinylene and 2,5-dimethoxy-1,4-phenylene vinylene.

This invention also relates to solutions of the homopolymers and copolymers of Formula I to VII comprised of one or more of said copolymers and homopolymers and a protic and/or an aprotic solvent. Useful solvents can vary widely and include such solvents as N-methyl pyrrolidone, dimethyl sulfoxide, water, ethanol, methanol, butanol, propanol, dimethylformamide, dimethylacetamide, propylene carbonate, sulfolane and the like, or mixtures thereof.

The solvent chosen for use in any particular situation will usually depend on the nature of the various substituents. For example, the more polar the particular substituents, the more polar the solvent; and conversely, the less polar the substituent the less polar the solvent. In the preferred embodiments of this invention, solvents are selected from the group consisting of water, methanol, sulfolane, dimethylformamide, N-methyl pyrolidinone and mixtures thereof, and in the particularly preferred embodiments of the invention the solvent is selected from the group consisting of water, sulfolane, methanol and dimethyl formamide and mixtures there of. Particularly preferred is water.

The copolymers and homopolymers of Formulas I to VII can be conveniently prepared by treating a compound or group of compounds, whichever is applicable, of the following Formulas XV to XXI:

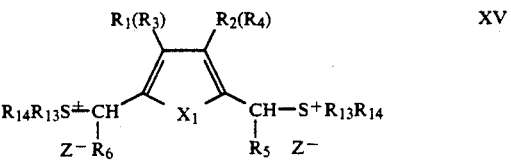

XV

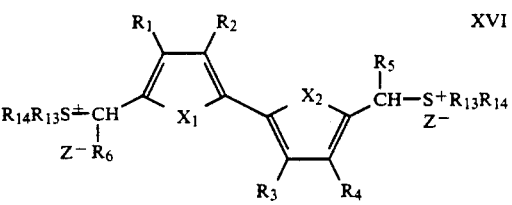

XVI

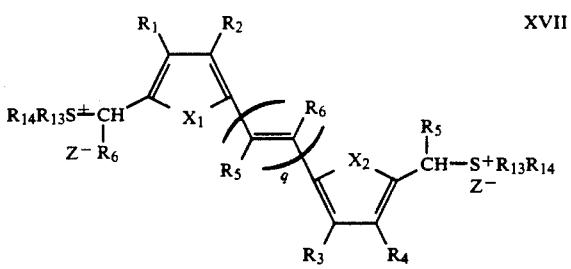

XVII

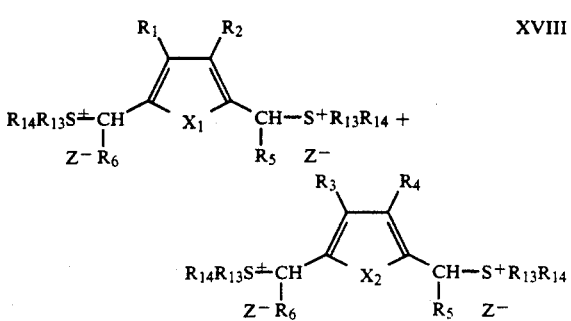

XVIII

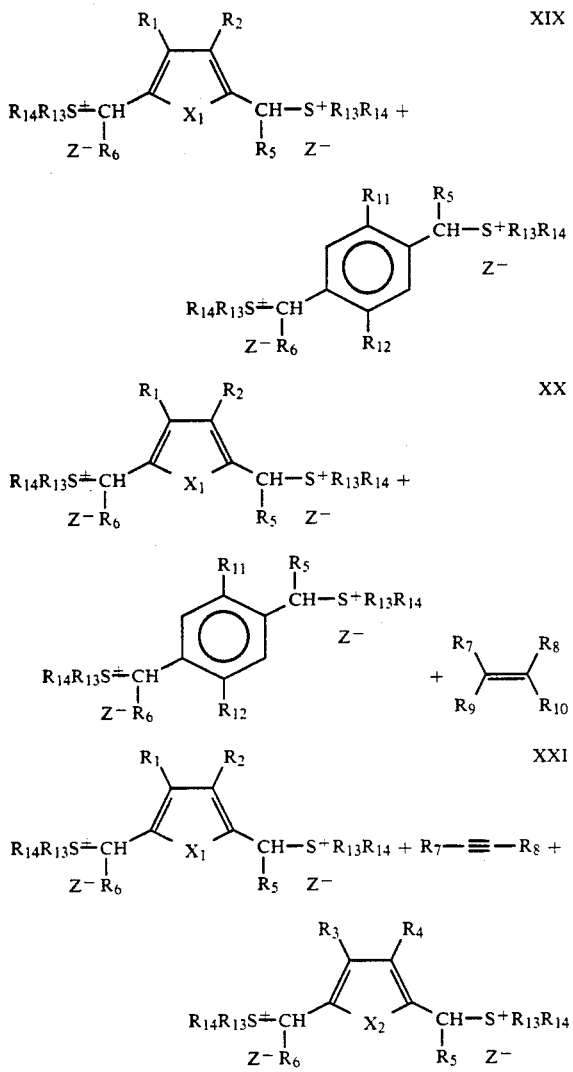

with a base. In general, this reaction is carried out in solution using one of the protic or aprotic solvents described above. Bases for use in this reaction are not critical and the only requirement being that the base is slightly soluble in the solvent in which the reaction is being conducted. Illustrative of useful bases are alkali metal hydroxides such as sodium hydroxide, lithium hydroxide, and potassium hydroxide; alkali metal carbonates and bicarbonates such as sodium carbonate, sodium bicarbonate, potassium carbonate, and potassium bicarbonate; and alkali metal alkoxides such as potassium t-butoxide, lithium methoxide, lithium ethoxide, sodium methoxide, sodium ethoxide, potassium methoxide, and potassium ethoxide. Preferred bases are sodium hydroxide, lithium hydroxide, potassium hydroxide, sodium methoxide, sodium ethoxide, potassium t-butoxide and sodium carbonate, and particularly preferred bases are sodium hydroxide, lithium hydroxide, potassium hydroxide, sodium methoxide, and sodium ethoxide. Amongst these particularly preferred embodiments, most preferred are those embodiments of the invention in which the base is sodium hydroxide, potassium hydroxide, and lithium hydrixode.

As noted above, solvents for use in this process are those in which the polymers of Formulas I to VII are soluble and can vary widely. Preferred solvents are water, methanol, ethanol, dimethylsulfoxide, sulfolane, dimethylformamide, N-methylpyrolidone and acetonitrile, and particularly preferred solvents are water, methanol, ethanol, dimethylformamide, and N-methylpyrolidone. Amongst those particularly preferred solvents, most preferred solvents are methanol, ethanol, dimethylformamide and water.

Reaction temperatures are not critical and can vary widely. In general, the polymerization reaction is carried out at a temperature of from about $-15°$ C. to about $200°$ C. In the preferred embodiments reaction temperatures of from about $-15°$ C. to about $50°$ C., and in the particularly preferred embodiments reaction temperatures are from about $-5°$ C. to about $5°$ C.

Reaction pressures are not critical and the reaction can be carried out at sub-atmospheric pressure, atmospheric pressure and super-atmospheric pressure For convenience, the reaction is carried out at atmospheric or autogeneous pressure.

Reaction times can vary widely In general, the reaction is carried out over a period of from about a few seconds to a few hours.

Another aspect of this invention relates to neutral or doped (electrically conductive) conjugated backbone co-polymers and homopolymers of the Formulas VIII to XIV which are prepared from the corresponding polymers of the Formula I, II, III, IV, V, VI and VII; to solutions of said conjugated backbone polymers in organic solvents; and to articles prepared from such polymers This invention includes neutral and electrically conductive forms of the conjugated backbone polymers of Formula VIII to XIV. Neutral forms of the polymers of Formulas VIII to XIV may be prepared from the corresponding polymers of Formulas I II III, IV, V, VI and VII. In general, these neutral conjugated backbone polymers are prepared by thermal treatment of the precursor polymers of Formulas I to VII, either as solutions or in the solid state as precast or prefabricated articles. Generally, useful temperatures may range from about $-10°$ C. to about $300°$ C. The thermal treatment eliminates HZ and $R_{13}R_{14}S$. Useful temperatures depend on the structure of the polymer, the nature of $Z^-$ and the structure of $R_{13}R_{14}$ and may vary widely. Temperatures which are generally useful can be determined by routine experimentation and should be such that preferably greater than about 80 mole% of $R_{13}R_{14}S$ and HZ are eliminated from the prepolymer, and more preferably temperatures should be such that about 90 mole % of $R_{13}R_{14}S$ and HZ is eliminated.

If HZ is an oxidant, as for example $HClO_4$, $HClO_3$, $H_2SO_4$, $HFeCl_4$, $HS_2O_8K$, $HFeO_4$, $HMnO_4$, $HBrO_3$ or the like, the conjugated backbone polymer will be spontaneously doped by the HZ after elimination. For these embodiments of the invention, preferred Z anions are $ClO_4^-$, $ClO_3^-$, $HSO_4$, $FeCl_4^-$, $KS_2O_8^-$, $FeO_4^-$, $MnO_4^-$, and $BrO_3^-$.

Chemical methods can also be used to convert prepolymers I to VII into conjugated polymers of Formulas VIII to XIV. In these chemical methods, the precursor polymers of Formulas I to VII, either in solution or in the solid state, are treated with a base. Lewis bases are particularly useful such as the hydroxides, ethoxides, butoxides, and isopropoxides of sodium, potassium and lithium, sodium or lithium hydride, amines such as trimethylamine, tributylamine and the like, ammonium hydroxides such as ammomium hydroxide, tetrabutyl ammonium hydroxide and the like, and carbonates such as sodium, potassium or lithium carbonate.

The electrically conductive forms of the polymers of Formulas VIII to XIV are formed by doping corresponding neutral forms of the polymer in solution or in the solid state. In general, these doped conductive forms are prepared by treatment of the conjugated polymer with chemical oxidizing agents (p-type dopants) or by electrochemical oxidation at the anode in an electrochemical cell. These procedures are described in more detail in U.S. Pat. Nos. 4,442,187 and 4,321,114. Dopants for use in the practice of this invention can vary widely and can be such materials which are known in the art for use in doping conjugated backbone polymers to form conductive or semi-conductive polymers, as for example those described in detail in US Pat. Nos. 4,442,187 and 4,321,114 which are hereby incorporated by reference. Illustrative of useful electron acceptor dopants are $I_2$, $AsF_5$, $AlCl_3$, $MoOCl_4$, $MoCl_5$, $NO^+$ and $NO_2^+$ salts (such as $NOBF_4$, $NOPF_6$, $NOSbF_6$, $NOAsF_6$, $NOCuCl_3$, $NOCH_3SO_3$, $NO_2BF_4$, $NO_2PF_6$, $NO_2AsF_6$, $NO_2SbF_6$, and, $NO_2CF_3SO_3$), $O_2^+AsF_6^-$, HClOhd 4, $HNO_3$, $H_2SO_4$, p-toluenesulfonic acid (TsOH), benzoylperoxide, $CF_3SO_3H$, $SO_3$, $Br_2$, $(FSO_3)_2$, $FSO_3H$, $Fe(ClO_4)_3$, $FeCl_3$, $Fe(OTs)_3$, and $Fe(CF_3SO_3)_3$, Ag salts such as $AgSbF_6$, $AgCF_3SO_3$, and AgOTs which give rise to doped polymers containing dopant solutes such as $I_3^-$, $NO_3^-$, $BF_4^-$, $PF_6^-$, $AsF_6^-$, $Cl^-$, $Br^-$, $SbF_6^-$, $CF_3SO_3^-$, $CF_3CO_2^-$, $MoOCl_4^-$, $MoCl_6^{--}$, $HSO_4^-$, $AlCl_4^-$, $ClO_4^-$, $OTs^-$, $SO_3^-$, $C_6H_5CO_2^-$, $Br_3^-$, $CH_3SO_3^-$, $FSO_3^-$, and $FeCl_4^-$. Other useful electron acceptor dopants include electrolyte salts such as $LiClO_4$, $LiBF_4$, $LiAsF_6$, $NaPF_6$, $Bu_4NClO_4$, $Bu_4NOTs$, $LiCF_3CO_2$, $Bu_4NCF_3SO_3$, $LiCF_3SO_3$, AgOTs, and the like, which can be dissolved in a suitable solvent and used to dope the homopolymer or copolymer by electrochemical oxidation of the polymer at the anode of an electrochemical cell.

Still other useful dopant solutes include the aforementioned anions, or polymeric electrolytes such as polymers substituted with one or more anionic functional groups such as carboxylic acid or sulfonic acid groups, as for example polyethylene sulfonic acid, polyacrylic acid, polymethacrylic acid, polystyrene sulfonic acid and co-polymers thereof which can be incorporated into the polymer as the dopant solute concomitant with oxidizing the polymer electrochemically or with an oxidant such as oxygen, hydrogen peroxide, $KS_2O_8$, $NaClO_3$, $Br_2$, $Cl_2$, $NaClO_4$ and the like.

Preferred for use in the practice of this invention are electron acceptor dopants. While we do not wish to be bound by any theory, it is believed that solid articles composed of polymers of this invention doped with electron-acceptor dopants are more stable to air and water vapor than the corresponding polymers doped with electron-donor dopants. Particularly preferred for use in the conduct of this invention are electron acceptor dopants which give rise to doped polymers containing, the following dopant solutes: $I_3^-$, $CF_3SO_3^-$, $CH_3SO_3^-$, $NO_3^-$, $TsO^-$, $FeCl_4^-$, $SbF_6^-$, $PF_6^-$, $BF_4^-$, $ClO_4^-$, and $PhCO_2^-$.

Preferred doping levels are those that provide environmentally stable compositions having electrochemical potentials less than about 1.0 volts vs. standard calomel electrode (SCE). More preferred are doping levels which provide compositions having electrochemical potentials less than about 0.8 volts vs. standard calomel electrode; and most preferred are doping levels which provide compositions electrochemical potentials less than about 0.5 volts vs. standard calomel electrode.

As was noted above, this invention also relates to solutions of both the neutral and conductive forms of the polymers of Formulas VIII to XIV. The solvent type employed can vary widely, from polar to nonpolar. In general, solvents which can be used in the practice of this invention will have a dipole moment greater than zero and less than or equal to about 5, and a dielectric constant of less than about 70. Illustrative of useful solvents are sultones, such as propane sultone, butane sultone, pentane sultone and the like; alkyl alkanesulfonates such as methyl methanesulfonate, ethyl methanesulfonate, butyl methanesulfonate, propyl ethanesulfonate and the like; linear and cyclic ethers such as 1,2-dimethoxy ethane, dimethoxy methane, dioxane, glymes, diglymes, tetrahydrofuran, 2-methyltetrahydrofuran, anisole, diethylether and the like; nitriles such as acetonitrile, propionitrile, butyronitrile, benzonitrile and the like; hydrocarbons such as cyclohexane, pentane, hexane and cyclopentane; halocarbons such as carbon tetrachloride, dichloromethane, and 1,2-dichloroethane, aromatic solvents such as benzene, toluene, xylene, nitrobenzene and the like; ketones such as 4-methyl-2-pentanone, methylethylketone, acetone, and the like; carbonates such as propylene carbonate, dimethyl carbonate, ethylene carbonate and the like; esters such as methyl formate, methyl acetate, q -butyrolactone, ethyl acetate and the like; nitriles such as benzonitrile, propionitrile, and acetonitrile; nitroalkanes, such as nitromethane, nitroethane, nitropropane, and the like; amides such as dimethyl formamide, dimethyl thioformamide, N,N-dimethyl acetamide, N-methylpyrrolidinone and the like; organophosphorus compounds such as hexamethyl phosphoroamide, diethylphosphate, triethylphosphate, trimethylphosphate and the like; and organosulfur compounds such as sulfolane, methyl sulfolane, dimethyl sulfone, dimethyl sulfoxide, dimethyl sulfolane, glycol sulfite, tetraethylsulfamide and the like. Mixtures of such organic solvents can also be used as for example mixtures of sulfolane and acetonitrile.

Solvent selected for use in any particular situation will depend primarily on the polarity of various $R_1$, $R_2$, $R_3$, $R_4$, $R_5$, $R_6$, $R_7$, $R_8$, $R_9$, $R_{10}$, $R_{11}$, and/or $R_{12}$ substituents, and/or the state of the polymer, i.e. doped or undoped. In general, more polar substituents and higher doping levels of the polymer, will require solvents with higher dielectric constants and dipole moments (within the above specified range). Conversely, less polar substituents and lower doping levels of the polymer, will require solvents with lower dielectric constants and dipole moments (within the above specified ranges).

In general, solvents chosen for use with doped polymers and/or those having relatively polar substituents will usually have a dipole moment of from about 0.3 to about 5.0, preferably from about 2.5 to about 5.0; and a dielectric constant of from about 2.0 to about 70, preferably from about 20 to about 65. Illustrative of such solvents are linear and cyclic ethers, such as tetrahydrofuran, tetrahydropyran, 2-methyltetrahydrofuran, diethylether, diglyme, glyme and the like; halocarbons such as chloroform, 1,2-dichloroethane, dichloromethane and the like; amides, such as dimethylformamide, N,N-dimethylacetamide, N-methyl pyrrolidone and the like; substituted aromatics, such as xylene, anisole, toluene and the like; nitriles, such as acetonitrile, propionitrile, benzonitrile, butyronitrile, and the like; sulfoxides and other sulfur containing solvents such as dimethylsulfoxide and the like; nitro substituted alkanes and aromatics such as nitromethane, nitropropane, nitrobenzene and the like; and carbonates such as propylene carbonate, ethylene carbonate and the like.

In general solvents chosen for use with undoped polymers and/or those having relatively non-polar substituents will have a dipole moment of from about 0 to about 3.0, preferably from about 0 to about 2.0; and a dielectric constant of from about 2.0 to about 35, preferably from about 2.0 to about 20. Illustrative of such solvents are halocarbons such as dichloromethane, and the like; aromatic solvents such as toluene, xylene, benzene and the like; cyclic and linear ethers such as dimethoxyethane, tetrahydrofuran and the like; esters such as ethylacetate, methyl formate and the like; sulfoxides, such as dimethylsulfoxide and the like; cyclic and linear amides, such as dimethylformamide, N-methylpyrrolidone, N,N-dimethylacetamide and the like; and ketones such as acetone and the like.

The proportion of polymer and solvent in the solution of this invention containing the neutral copolymer or homopolymer and the organic solvent; and the solution containing the doped polymer and solvent are not critical and can vary widely. However, the following guidelines are believed important for achieving solutions particularly useful in the present invention. In general, the amount of solvent as a proportion of the amount of solution is not believed to be critical, since any amount as a liquid will form at least a viscous gel with doped or undoped polymers. These viscous embodiments of the invention are particularly useful for silkscreening conductive circuitry and for applying thick film coatings on substrates. For other applications, it may be preferred, however, to use sufficient liquid solvent to lower the viscosity of the gel or solution to a point where it flows at least sufficiently to conform to a container shape or mold in a reasonably short period of time, e.g., in 30 minutes or less. Preferably, the solvent is present in sufficient amounts to lower the viscosity of the solution to less than about 2,000 centipoise, and more preferably from about 1 to about 1000 centipoise.

The solution of this invention may include a third essential ingredient which is an electron dopant solute. The purpose of the dopant is to dope the polymer, and render it electrically conductive both in solution, and in the solid article derived from the solution. In general, such a solute is derived from a compound which upon addition to the polymer ionizes the polymer with concomittent disproportionation into a neutral and anionic dopant solute species. The dopant for use in the practice of this invention can vary widely and can be such materials which are known in the art for use in doping conjugated backbone polymers to form conductive or semi-conductive polymers, as for example those described in detail in U.S. Pat. Nos. 4,442,187 and 4,321,114 which are hereby incorporated by reference.

The amount of dopant employed in the solution of the doped homopolymer or copolymer is also not believed to be critical and can vary widely. In general, the amount of dopant employed is sufficient to provide a doped polymer (either in solid form or in solution) which is a semi-conductor or a conductor. In general, the amount of dopant employed is at least sufficient to provide a doped polymer having an electrical conductivity (either in solution or in solid form) equal to or greater than about $10^{-2}$ ohm$^{-1}$ cm$^{-1}$. The upper conductivity is not critical, and usually the highest conductivity which can be obtained is provided. In the preferred embodiments of the invention, the amount of dopant employed is at least sufficient to provide a doped polymer having an electrical conductivity equal to or greater than about $10^{-1}$ ohm$^{-1}$ cm$^{-}$, and in the particularly preferred embodiments, an amount at least sufficient to provide a doped polymer having a conductivity equal to or greater than about $10^0$ ohm$^{-1}$ cm$^{-1}$. Amongst these particularly preferred embodiments, most preferred are those embodiments of the invention in which the amount of dopant is at least sufficient to form a doped polymer having an electrical conductivity equal to or greater than about $10^{+1}$ ohm$^{-1}$ cm$^{-1}$ with a conductivity equal to or greater than $10^{+2}$ ohm$^{-1}$ cm$^{1}$ being the conductivity of choice.

However, as noted in Example 11, in the case of poly(thiophene vinylene), doped with PF$_6^-$, to obtain doped polymer having an optimal compromise between high electronic conductivity and good environmental and chemical stability, a strong preference is indicated for minimizing the doped polymers' chemical potential, especially by not entering the region of rapidly increasing potential which occurs beyond a 25 mole % per monomer unit doping level. In these embodiments, preferred doping levels are from about 20 to about 25 mole %.

In addition to the essential copolymer or homopolymer, dopant and solvent, or copolymer or homopolymer and solvent, whichever is applicable, the solutions of this invention can include other optional ingredients which either dissolve or do not dissolve in the solution. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional polymers such as polyacrylonitrile, polyvinylidine chloride, polyethylene oxide, polystyrene, nylon, celulose acetate butyrate, polypropylene, polyethylene, celulose acetate, polyphenylene oxides and the like. In the case of non-soluble fourth components, materials may be present which either fill or form a substrate for the conductive polymer cast from the solution. These fourth components include other conductive polymers, other polymers such as polyacetylene which may become conductive upon doping, graphite, metal conductors, reinforcing fibers and inert fillers (such as clays and glass).

The method of forming the solutions of this invention is not critical and can vary widely. For example, one preferred method of forming the present solution containing the doped homopolymer or copolymer is to react, simultaneously, the polymer, the dopant and the solvent as a liquid. Thus, for example, by introducing poly(3-n-butylthienylene vinylene-co 3-ethylthienylene vinylene) as a solid powder, nitrobenzene as a liquid and iodine as a solid into a mixing vessel, a solution of the doped polymer is quickly formed, from which conductive polymer can be cast. The conditions of such mixing are not critical, provided that sufficient iodine is used to dope the desired quantity of polymer and sufficient solvent is employed to reduce the viscosity of the solution to manageable levels. An alternate technique of preparing the solution of this invention containing the doped polymer is to mix first the polymer and the solvent, which can form a homogeneous solution or remain as a two-phase system almost indefinitely depending on the solvent chosen, and thereafter add the dopant to the solution or two phase system. Thus, for example, if poly (3-butylthienylene vinylene) powder is admixed with nitromethane solvent, the powder will remain on or suspended in the solvent for extended periods under normal conditions. The addition of a dopant to this suspension, such as $NOSbF_6$, causes the powder to be doped and, almost instantaneously thereafter, causes the doped polymer to go into solution. A second alternate technique for forming the solution of this invention containing the doped homopolymer or copolymer is to form the dopant solute from part of the solvent, either in the presence of the polymer solute or followed by addition of polymer solute. Thus, for example, adding poly (3-n-butyl thienylene vinylene) to a solvent such as $FSO_3H$ produces a solution of the polymer doped with $FSO_3^-$.

The solution of this invention which contains the neutral polymer can be prepared merely by dissolving the polymer in a solvent in which it is soluble. For example, solutions of poly (3-n-butylthienylene vinylene) can be conveniently prepared merely by adding the desired amount of the polymer to a solvent, such as toluene or nitrobenzene, in which the polymer is soluble.

Various methods are contemplated for using the solution of the present invention. First, with regard to solutions of both the conductive doped polymer and the neutral polymer, it is contemplated to remove the solvent from the solution to allow the copolymer or homopolymer to solidify. In the case of the solution of the doped polymer, excess dopant precursor, if present may be removed from the solution by some suitable conventional method if desired. The solvent can be removed from the solution through use of any conventional solvent removal method but is removed preferably by evaporation. Alternatively, the solvent and dopant precursor can be removed by extraction with an extractant in which the solvent and dopant precursor are substantially more soluble than the doped polymer.

As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold. It is contemplated that, if fourth or additional soluble components are introduced into the solution, they will, unless also volatile, be present in the shaped article formed. If the fourth component is a non-volatile liquid, then the removal of volatile components may leave a new liquid or plasticized form of doped conducting polymer or undoped neutral polymer. If the additional components are volatile, then foamed or expanded cellular forms of the polymer may be formed.

In those embodiments of the invention in which the solution contains a doped polymer, a conductive or semiconductive article is formed upon removal of the solvent. However, in those embodiments of the invention in which the solution contains a neutral polymer, the resulting article must be contacted with a suitable dopant to render the article conductive or semiconductive. For example, a solution of neutral poly(3-n-butylthienylene vinylene) can be prepared by dissolving the polymer in a solution such as tetrahydrofuran, toluene or nitrobenzene. Solvent can removed from solution forming an article composed of the neutral polymer. Thereafter, the polymer article is exposed to a suitable electron-acceptor dopant, as for example iodine or nitrosonium salts dissolved in a solvent in which the neutral and doped polymer are not soluble, for a time sufficient to dope the polymer article to the desired extent. The upper conductivity of the polymer is not critical, and usually the highest conductivity which can be obtained is provided. In general, the polymer is doped until it has an electrical conductivity equal to or greater than $10^{-2}$ ohm$^{-1}$ cm$^{-1}$. In the preferred embodiments of the invention, doping is continued until the electrical conductivity of the polymer is equal to or greater than about $10^{-1}$ ohm$^{-1}$ cm$^{-1}$ and, in the particularly preferred embodiments doping is continued until the electrical conductivity is equal to or greater than about $10^{+1}$ ohm$^{-1}$ cm$^{-1}$ In the most preferred embodiments, doping is continued until conductivities equal to or greater than about $10^{+2}$ ohm$^{-1}$ cm$^{-1}$ are obtained.

In the event that fourth or additional non-soluble components are present (or suspended) in the solution, the doped polymer will form around, or be filled with, the insoluble material. If, for example, the additional components are glass fibers, the relative amounts of fibers and doped polymer remaining will cause either the polymer to be fiber-filled, the fibers to be polymer impregnated, or some intermediate composite of fibers and doped polymer to be formed. In the case of systems wherein the amount of non-soluble component greatly exceeds the doped polymer remaining, individual particles or shapes of non-soluble components coated or impregnated with doped polymer will be formed. Examples of articles formed from non-soluble components and the present polymer solutions include conductive polymer coated-housings for sensitive electronic equipment such as, microprocessors; infrared and microwave absorbing shields; flexible electrical conducting connectors, antistatic coatings, conductive bearings and brushes and semiconducting photoconductor junctions.

It is also contemplated to use the present solutions as such as either liquid conductors or liquid semiconductors, much in the manner that liquid mercury is used in various devices. Examples of such devices include gravity switches, fluid level detecting devices or other electrical or electronic switches. Such use is based upon the conductivity of the doped solution, which the case of poly (3-n-butylthienylene vinylene) doped with iodine in toluene can represent a relatively high conductivity (from about $10^{-1}$ to about $10^2$ ohm$^{-1}$ cm$^{-1}$) which appears to be predominantly of an electronic rather than ionic nature.

A fourth application for the present polymer solutions is in the doping of other materials, and especially other conjugated backbone polymers which could also be doped by the electron-acceptor dopant alone. Such doping may occur as a part of the process of casting the polymer solution onto the second polymer article, but may also be accomplished without, necessarily, casting the conductive polymer from the solution.

The following specific examples are present to illustrate the invention and are not to be construed as limitations thereon.

EXAMPLE 1

Preparation of 2,5-bis-(chloromethyl)thiophene

To a stirred solution of 37% formaldehyde (204 mL, 2.8 mole) and conc. hydrochloric acid (50 mL) was bubbled a stream of dry hydrogen chloride at 0° C. until the solution was saturated. Thiophene (70 g, 0.78 mole) was added dropwise to the solution at 0° C. for a period of 20 minutes. After addition, the mixture was stirred for another 20 minutes then washed five times with water (200 mL). The resulting mixture was refrigerated overnight then filtered by using Filter-cel to remove some paraformaldehyde.

The brownish solution was distilled under vacuum (86°-90° C./0.5 mmHg) to give a colorless liquid which solidified at room temperature. Yield (80g, 57%) M.P. 36°-37° C. (Lit. M.P. 36°-37° C., J. M. Griffing and L. F. Salisbury, J. Amer. Chem. Soc. 3416, 70, (1948)).

EXAMPLE 2

Preparation of 2,5-bis(dimethylsulfonium methyl)thiophene chloride

To a stirred solution of 2,5-bis(chloromethyl) thiophene (1.81 g, 0.01 mole) in dry methanol (5 mL) was added methyl sulfide (10 mL, 0.13 mole) in one portion at room temperature (under argon) and the mixture was stirred at room temperature for twenty hours.

The solvent was then evaporated under vacuum and the resulting product was washed twice with anhydrous diethylether (20 mL) and dried.

EXAMPLE 3

Preparation of 2,5-bis(tetrahydrothiophenonium methyl)thiophene chloride

To a stirred solution of 2,5-bis(chloromethyl) thiophene (1.81 g, 0.01 mole) in a dry methanol (5 mL) was added tetrahydrothiophene (10 mL, 0.11 mole) in one portion at room temperature (under argon) and the mixture was kept stirring at room temperature for twenty hours. The material was purified by concentration, precipitation in cold acetone, filtration, followed by vacuum drying. The product was obtained as a white crystalline powder. Yield (2.86 g, 80%)

EXAMPLE 4

Preparation of the water soluble polyelectrolyte precursor to poly(2,5-thienylene vinylene)

To a degassed, stirred solution of 2,5-bis-(dimethylsulfonium methyl)thiophene chloride (3.05 g, 0.01 mole) in distilled water (15 mL) at 0° C. was added a cooled (0° C.) degassed solution of sodium hydroxide (0.4 g, 0.01 mole) in distilled water (10 mL).

A light orange color developed immediately and the solution became viscous. After stirring at 0° C. for 1 hour the solution was neutralized with hydrochloric acid to pH approximately 7.0 to give a solution of the desired polyelectrolyte.

EXAMPLE 5

Preparation of Poly(2,5-thienylene vinylene)

Part (I): The viscous solution of Example 4 was evaporated under vacuum with gentle heating (40° C. to 65° C.). The light yellow solution formed a homogeneous film coating on the flask, the color of which changed slowly from orange to red to dark purple within 2 hours. The so-formed film was rinsed with methanol, then peeled off the glass. The shiny surface of the film had a golden metal-luster; film thickness was 40 microns. The polymer had a molecular weight of approximately 100,000, i.e., about 925 repeating units.

The film was further purified by Soxhlet extraction with hot methanol overnight.

Elemental analysis: Calcd. for poly (2,5-thienylene vinylene $C_6H_4S$)=C, 66.66%; H, 3.73%; S,29.61%. Found: C, 65.21%; H, 4.33%; S, 29.39%; Cl<0.6%

EXAMPLE 6

Preparation of a Foam-form of poly(2,5-thienylene vinylene)

The viscous solution of Example 4 was vacuum dried with rapid heating (90° C.-100° C.). Because of the rapid elimination of $Me_2S$ (methyl sulfide) and hydrochloric acid, the resulting polymer was obtained as a foam of low density (0.25 g/cm$^3$). After extracting with hot methanol, the spongy polymer had a golden luster. The polymer had a molecular weight of approximately 100,000, i.e., about 925 repeat units.

EXAMPLE 7

The viscous solution of Example 4 was purified by membrane dialysis against water (M.W. cut off 3500) After five minutes of dialysis at room temperature, the polymer precipitated in the membrane to give a light yellow powder. The partially eliminated polyelectrolyte appeared stable to further elimination and could be stored in a refrigerator for a long period of time.

The yellow solid was fabricated into sheets using a hot press (10,000 pound/sq. in., 150° C.). The pressed films were strong and tough. The degree of elimination of methyl sulfide and hydrogen chloride can be controlled by controlling the heating time to give polymers with varying degrees of conjugation and ultimate conductivity. By this method, films ranging in conductivity offer doping can be controllably varied from about $10^{-10}$ S/cm to $10^{+2}$ S/cm.

EXAMPLE 8

Preparation of iodine doped poly(2,5-thienylene vinylene)

A piece of poly(2,5-thienylene vinylene) (from Example 5) with a thickness of 40 micron was doped with iodine vapor at room temperature for 10 minutes. The conductivity was measured using a four-in-line probe with 1 mm spacings. The two outer probes were connected to a Keithley Model 225 constant current source. The inner two probes were connected to a Keithley Model 616 Electrometer for voltage measurement.

The conductivity (s) of this blue-black doped film was calculated to be 56 ohm$^{-1}$cm$^{-1}$ (equivalent to S/cm) by using the formula:

$$s = \frac{\ln 2}{\pi d} \times \frac{I}{V}$$

where "d" is the sample thickness (40), "I" is the constant current passed through the outer probes (1 mA) and "V" is the measured voltage drop across the inner two probes (0.98mV).

EXAMPLE 9

Preparation of $FeCl_{13}$ (Ferric chloride) doped poly(2,5-thienylene vinylene)

To a stirred solution of $FeCl_3$ (30 mg) in $CH_3NO_2$ (10 mL) was added at 0° C. a piece of 1 cm square poly(2,5-thienylene vinylene) having a thickness of 40 microns. After 5 minutes, the doped film was rinsed with nitromethane and toluene then dried under vacuum. The conductivity of the doped film was found to be 35 $ohm^{-1}cm^{-1}$.

EXAMPLE 10

Preparation of $NOSbF_6$ (nitrosyl hexafluoroantimanate) doped poly(2,5-thienylene vinylene)

To a stirred solution of $NOSbF_6$ (50 mg) in nitromethane (10 mL) was added at 0° C. a piece of 1 cm square poly(2,5-thienylene vinylene) thickness of 40 microns. After 5 minutes the doped film was rinsed with nitromethane and toluene then dried under vacuum.

The conductivity of the doped film was found to be 7.5 $ohm^{-1}cm^{-1}$.

EXAMPLE 11

A free standing film of poly(2,5-thienylene vinylene) synthesized by the method of Example 1 was mounted in an electrochemical cell. The film had dimensions 1.5 cm×0.5 cm×0.01 cm and weighed 1.91 mg. The film was held against a glass support by four equally spaced platinum wires which were alternately used together as a grid to supply electrochemical doping current to the polymer sample, and independently as a 4-probe contact to the sample for the measurement of conductivity. The sample was immersed in an electrolytic solution of 0.2M $NaPF_6$ in benzonitrile. The cell was also equipped with a counter electrode composed of $Na_xCoO_2$ (a reversible sodium-ion inserting electrode). Electrochemical doping ($PF_6^-$ insertion) was carried out by a step-wise anodic increase in the potential of the polymer electrode with respect to a silver wire reference (such a reference being approximately equal to standard calomel electrode (SCE) reference). The current flowing during each step was integrated to determine charge passed and thus doping level of the polymer. Electrochemical undoping ($PF_6^-$ extraction) was carried out by the reverse step-wise process. In an attempt to obtain uniform doping small voltage steps (20 mV) were used and the current was allowed to decay to a low value 20 $A/cm^2$ before the next step was made. In addition, after the completion of each step, the polymer sample was allowed to rest at open-circuit for 3 minutes and then a 4-probe AC conductivity measurement (155 Hz) was made. Simultaneous data were thus obtained relating doping level, electrochemical potential, and conductivity. The conductivity was found to increase rapidly until a doping level of about 20 to 25% mole was reached, $[(C_4H_2-C_2H_2-)-(PF_6^-)_{0.25}]x$. Over this same range of doping up t mole, the electrochemical potential was found to increase moderately. As doping proceeded beyond 25% mole, the potential increased more rapidly with increasing doping level (y). Conductivity reached a maximum of 37 S/cm at approximately a 33% mole doping level and the amount of $PF_6^-$ which could be extracted during the reduction of the oxidized sample did not exceed 30% mole. While we do not wish to be bound by any theories, the data suggest that degradation of the polymer complex occurs upon attempts to dope beyond 33% mole. Further, and most importantly, we have identified a preferred range of compositions extending from 20 to 25% mole doping, (i.e., $[(-C_4H_2S-C_2H_2)(PF_6)_y]x$ with $0.2 \leq y \leq 0.25$), which compositions offer an optimal compromise between high electronic conductivity and good environmental and chemical stability of the doped polymer. The latter question of environmental stability (i.e., stability to ambient conditions) relates to the electrochemical potential of the complex where too high a potential results in instability (reactivity) toward atmospheric water vapor. Thus, a strong preference is indicated for minimizing the potential by not entering the region of rapidly increasing potential which occurs beyond 25% doping.

EXAMPLE 12

Preparation of 3-methoxythiophene

To a stirred solution of sodium methoxide in methanol (25 wt. %, 180 mL) was added 3-bromothiophene (45g, 0.28 mole), potassium iodide (0.75g, 4.5 mmol), and cupric oxide (11.2g, 0.14 mole). The mixture was refluxed under ($N_2$) for 100 hours.

The cold mixture was then filtered, diluted with two volumes of water and extracted with ether (250 mL×2). The combined ether portions were washed with water (100 mL), dried with anhydrous sodium sulfate and fractionally distilled under vacuum (water aspirator) (66°-67° C.) to give a colorless liquid (19.5g, 60%). (Lit. b.p. 80°-82° C./65 mmHg) (S. Gronowitz, Arkiv. Kemi., 239, 12, (1957).)

EXAMPLE 13

Preparation of 1,2-bis(3-methoxy-2-thienyl) ethylene

To a stirred solution of 3-methoxythiophene (5.7g, 50 m mole) in anhydrous ether (100mL) was added dropwise 1 equivalent of n-butyllithium at 25° C.

After stirring at 25° C for 2 hours, anhydrous magnesium bromide (12.91g, 50 mmol) was added in one portion. After further stirring for 1 hour, the mixture was transferred to an addition funnel and added dropwise to a stirring mixture of trans-dichloro[1,3-bis(diphenylphosphino)propane] nickel (II) (50 mg) in anhydrous ether (30 mL) at 0° C. under argon.

After the addition, the mixture was stirred at room temperature overnight then washed with water (50 mL×2), dried over anhydrous sodium sulfate, and evaporated. The remaining red solids were washed with petroleum ether (35°-60° C.) to give red crystals of 1,2-bis-(3-methoxy-2-thienyl)ethylene (5.6g, 45%).

EXAMPLE 14

Preparation of poly(3-methoxy-2,5-thienylene vinylene)

To a stirred solution of 1,2-bis(3-methoxy-2-thienyl)ethylene (2.52g, 10 mmol) in anhydrous tetrahydrofuran (40mL) was added dropwise two equivalents of n-butyllithium at 25° C.

After stirring at 25° C. for 2 hours, anhydrous magnesium bromide (5.16g, 20 mmol) was added in one portion. After an additional hour, trans-1,2-dichloroethylene (0.97g, 10 mmol) and dichloro [1,3-bis(diphenylphosphino)propane]nickel (II) (50 mg) was added in one portion at 0° C. under Argon.

The mixture was refluxed overnight, then precipitated in methanol (300 mL) and filtered. The solids were Soxhlet extracted with hot ethanol and acetone, then dried to give dark purplish black solids (1.8g, 65%). The solids were very soluble in tetrahydrofuran, toluene, dimethylformamide, and methylene chloride. The polymer had an average molecular weight of approximately 20,000, approximately 145 repeating units.

EXAMPLE 15

Preparation of poly(3-methoxy-2,5-thienylene vinylene) doped with $NOSbF_6$

To a stirred suspension of poly(3-methoxy-2,5-thienylene vinylene) (50 mg) in nitromethane (10 mL) was added $NOSbF_6$ (60 mg) in one portion at 0° C. ($N_2$).

The solid polymer turned blue immediately with the release of a brown gas. After stirring at 0° C. for 15 minutes, the blue-black powder was filtered and washed several times with nitromethane and methylene chloride to remove excess dopant. After drying under vacuum, the powder was pressed into a disk-shaped pellet 7 mm in diameter using a KBr infrared die. The conductivity of the pressed pellet was 0.5 S/cm as measured by the four point probe technique described in Example 8.

EXAMPLE 16

Preparation of 2,5-bis-(chloromethyl)furan

To a stirred solution of furan-2,5-dimethanol (25 mg, 0.2 mol) and pyridine (38.4 g, 0.48 mol) in a dry chloroform (120 mL) was added dropwise a solution of thionyl chloride (52.4 g, 0.44 mol) in dry chloroform (80 mL) at −40° C. (Ar) for 1.5 h. After addition, the mixture was stirred at −40° C. for 0.5 h then warmed to 0° C. for 0.5 h. After quenching with ice water (300 mL), the organic phase was washed with 5% sodium hydroxide (10 mL), dried, then evaporated to give a light brown oil. The brownish oil was distilled under vacuum (80°-82° C., 0.5 mmHg) to give a colorless liquid which solidified at room temperature. Yield: 24 g (75%); M.P. 27°-28° C. (M.P. 27°-28° C., K. Yu. Noritskii, V. P. Volkoo, and Yu. K. Yuiey, *Zhur. Obscher. Khim.*, 1961, 31, 538.)

EXAMPLE 17

Preparation of 2,5-bis(tetrahydrothiophenonium methyl)furan chloride

To a stirred solution of 2,5-bis(chloromethyl)furan (8.3 g, 0.05 mole) in dry methanol (35 mL) was added tetrahydrothiophene (25 mL, 0.28 mol) in one portion at room temperature (under Argon) and the mixture was stirred at room temperature for twenty hours. The material was purified by concentration, precipitation in cold acetone, filtration followed by vacuum drying. The product was obtained as a white crystalline powder. Yield: 15.1 g (88%).

EXAMPLE 18

Preparation of the water soluble polyelectrolyte precursor to poly(2,5-furylene vinylene)

To a degassed, stirred solution of 2,5-bis(tetrahydrothiophenonium methyl) furan chloride (3.41 g. 10 mmol) in distilled water (23.3 mL) at 0° C. under argon was added a cooled (0° C.) degassed solution of sodium hydroxide (0.4 g, 10 mmol) in distilled water (10mL). A light yellow color developed immediately and the solution became viscous. After stirring at 0° C. for 1 h, the solution was membrane dialyzed against water (MWCO=3500).

EXAMPLE 19

Preparation of poly(2,5-furylene vinylene)

The viscous solution of the polyelectrolyte precursor was evaporated under vacuum at room temperature until all the water was removed. At this time the purple film was heated at 65° C. for 1 h then the temperature was raised to 95° C. at a rate of 10° C. per hour. The resulting golden lusterous film was then rinsed with methanol, water, and acetone, then vacuum dried. The film was further heated in vacuum at 180° C. for 5 hours. The so-formed film was Soxhlet extracted with hot tetrahydrofuran to give poly(2,5-furylene vinylene) film of 20–40 micron thickness.

EXAMPLE 20

Preparation of iodine doped poly(2,5-furylene vinylene)

A piece of poly(2,5-furylene vinylene) with a thickness of 20 microns was doped with iodine vapor at room temperature for 15 minutes. The conductivity of this blue-black doped film was found to be 35 S/cm by the four-point probe technique.

EXAMPLE 21

Preparation of 1,2-bis(3-propyl-2-thienyl) ethylene

To a stirred solution of 2-bromo-3-propylthiophene (11.28 g, 55 mmol) in anhydrous ether (100 mL) was added dropwise 2 equivalents of t-butyllithium at −78° C.

After stirring at −78° C. for 1 hour, anhydrous magnesium bromide (14.23 g, 55 mmol) was added in one portion. After further stirring for 2 hours, the mixture was transferred to an addition funnel and added dropwise to a mixture of trans-1,2-dichloroethylene 2.71 g, 28 mmole) and dichloro[1,3-bis(diphenylphosphino)propane] nickel (II) (50 mg) in anhydrous ether (30 mL) at 0° C. under argon.

The mixture was stirred at room temperature overnight then washed with water (50 mL×2), dried over anhydrous sodium sulfate, and evaporated. The remaining solution was purified through a silica gel column (hexane as eluent) which gave 5.2 g (34%) of pure product.

EXAMPLE 22

Preparation of poly(3-propyl-2,5-thienylene vinylene)

To a stirred solution of 1,2-bis(3-propyl-2-thienyl)ethylene (2.07g, 7.5 mmol) in anhydrous tetrahydrofuran (40mL) was added dropwise two equivalent of n-butyllithium at 25° C.

After stirring at 25° C. for 2 hours, anhydrous magnesium bromide (3.87g, 15 mmol) was added in one portion. After an additional hour, trans-1,2-dichloroethylene (0.73g, 7.5 mmole) and dichloro [1,3-bis(diphenylphosphino)propane]nickel (II) (50 mg) was added in one portion at 0° C. under Argon.

The mixture was refluxed overnight, then precipitated in methanol (300 mL) and filtered. The solids were Soxhlet extracted with hot ethanol and acetone, then dried to give dark purplish black solids (1.7g, 80%). The solids were very soluble in tetrahydrofuran, toluene, dimethylformamide, and methylene chloride. The polymer had a molecular weight of approximately 4,000, approximately 27 repeating units based on end-group analyses for Cl.

EXAMPLE 23

Preparation of poly(3-propyl-2,5-thienylene vinylene) doped with $NOSbF_6$

To a stirred suspension of poly(3-propyl-2,5-thienylene vinylene) (50 mg) in nitromethane (10 mL) was added $NOSbF_6$ (60 mg) in one portion at 0° C. ($N_2$).

The solid polymer turned blue immediately with the release of a brown gas. After stirring at 0° C. for 15 minutes, the blue-black powder was filtered and washed several times with nitromethane and methylene chloride to remove excess dopant. After drying under vacuum, the powder was pressed into a disk-shaped pellet 7 mm in diameter using a KBr infrared die. The conductivity of the pressed pellet was 0.8 S/cm as measured by the four-point-probe technique described in Example 8.

EXAMPLE 24

Preparation of the (1:1) Random Copolymer of 2,5-Thienylene Vinylene and 2,5-Furylene Vinylene To a degassed, stirred solution of 2,5-bis(tetrahydrothiophenonium methyl) thiophene (1.79 g, 5 mmol) and 2,5-bis(tetrahydrothiophenonium methyl) furan (1.71 g, 5 mmol) in distilled water (23.3 mL) at 0° C. was added a cooled (0° C.) degassed solution of sodium hydroxide (0.4 g, 10 mmol) in distilled water (10 mL).

A light orange color developed immediately and the solution became viscous. After stirring at 0° C. for 1 hour, the solution was dialyzed against cooled water (0° C.) for 1 hour then evaporated under vacuum with gentle heating (60° to 80° C.). The light yellow solution formed a homogeneous film coating on the vessel, the color of which changed from orange to red to dark purple within 2 hours.

The so formed film was rinsed with methanol then peeled off the glass. The shiny surface of the film had a golden metal luster; film thickness was 20-40 microns.

The film was further heated under vacuum at 180° C. for 2 hours then purified by Soxhet extraction with hot methanol overnight to give the copolymer.

EXAMPLE 25

Preparation of $FeCl_3$ (Ferric Chloride) Doped (1:1) Random Copolymer of 2,5-Thienylene Vinylene and 2,5-Furylene Vinylene To a stirred solution of $FeCl_3$ (30 mg) in $CH_3NO_2$ (10 mL) was added at 0° C. a piece of 1 cm square copolymer having a thickness of 40 microns. After 5 minutes, the doped film was rinsed with nitromethane and toluene then dried under vacuum. The conductivity of the doped film was found to be 40 $ohm^{-1}cm^{-1}$.

EXAMPLE 26

Preparation of the 1:1 Random Copolymer of 2,5-Thienylene Vinylene and 1,4-Dimethoxy-2,5-Phenylene-Vinylene To a degassed, stirred solution of 2,5-bis(tetrahydrothiophenonium methyl) thiophene (1.79 g, 5 mmol) and 2,5-bis(tetrahydrothiophenonium methyl)-1,4-dimethoxybenzene (2.06 g, 5 mmol) in distilled water (23 3 mL) at 0° C. was added a cooled (0° C.) degassed solution of sodium hydroxide (0.4 g, 10 mmol) in distilled water (10 mL).

A light orange color developed immediately and the solution became viscous. After stirring at 0° C. for 1 hour, the solution was dialyzed against water (0° C.) then evaporated under vacuum with gentle heating (45° C. to 80° C.). The light yellow solution formed a homogeneous film coating on the walls of the flask, the color of which changed from orange to red to dark purple within 2 hours.

The so-formed film was rinsed with methanol then peeled off the glass. The shiny surface of the film had a golden metal-luster; film thickness was around 40 microns.

The film was further heated under vacuum at 180° C. for 2 hours then purified by Soxhlet extraction with hot methanol overnight.

EXAMPLE 27

Preparation of Ferric trifluoromethane sulfonate doped Random copolymer of 2,5-Thienylene Vinylene and 1,4-Dimethoxy-2,5-phenylene vinylene To a solution of Ferric trifluoromethane sulfonate in nitromethane was added a 1 cm×2cm piece of copolymer film at room temperature. After three minutes, the film was removed and washed with fresh nitromethane and air dried. The conductivity of the film was found to be 10.1 S/cm by the 4-in-line probe technique.

EXAMPLE 28

Preparation of 1,2-bis(3-ethoxy-2-thienyl) ethylene

To a stirred solution of 3-ethoxythiophene (6.4g, 50 mmol) in anhydrous ether (100mL) was added dropwise 1 equivalent of n-butyllithium at 25° C.

After stirring at 25° C. for 2 hours, anhydrous magnesium bromide (12.91g, 50 mmol) was added in one portion. After further stirring for 1 hour, the mixture was transferred to an addition funnel and added dropwise to a stirring mixture of trans-1,2-dichloro ethylene (2.42 g, 25 mmole) and dichloro [1,3-bis(diphenylphosphino)-propane]nickel (II) (50 mg) in anhydrous ether (30 mL) at 0° C. under argon.

After the addition, the mixture was stirred at room temperature overnight then washed with water (50 mL×2), dried over anhydrous sodium sulfate, and evaporated. The remaining red solids were washed with petroleum ether (35-60° C.) to give brown crystals of 1,2-bis-(3-ethoxy-2-thienyl)ethylene (5.6g, 40%).

EXAMPLE 29

Preparation of poly(3-ethoxy-2,5-thienylene vinylene)

To a stirred solution of 1,2-bis(3-ethoxy-2-thienyl)ethylene (1.12g, 4 mmol) in anhydrous tetrahydrofuran (40mL) was added dropwise two equivalent of n-butyllithium at 25° C.

After stirring at 25° C. for 2 hours, anhydrous magnesium bromide (2.07g, 8 mmol) was added in one portion. After an additional hour, trans-1,2-dichloroethylene (0.39g, 4 mmol) and dichloro [1,3-bis(diphenylphosphino)propane]nickel (II) (40 mg) was added in one portion at 0° C. under Argon.

The mixture was refluxed overnight, then precipitated in methanol (300 mL) and filtered. The solids were Soxhlet extracted with hot ethanol and acetone, then dried to give dark purplish black solids (1.2g, 98%). The solids were very soluble in tetrahydrofuran, toluene, dimethylformamide, and methylene chloride. The polymer had a molecular weight of approximately 9,000, approximately 60 repeating units.

EXAMPLE 30

Preparation of poly(3-ethoxy-2,5-thienylene vinylene) doped with NOSbF$_6$

To a stirred suspension of poly(3-ethoxy-2,5-thienylene vinylene) (50 mg) in nitromethane (10 mL) was added NOSbF$_6$ (60 mg) in one portion at 0° C. (N$_2$). The solid polymer turned blue immediately with the release of a brown gas. After stirring at 0° C. for 15 minutes, the blue-black powder was filtered and washed several times with nitromethane and methylene chloride to remove excess dopant. After drying under vacuum, the powder was pressed into a disk-shaped pellet 7 mm in diameter using a KBr infrared die. The conductivity of the pressed pellet was 1.8 S/cm as measured by the four point probe technique described in Example 8.

What is claimed is:

1. A homopolymer or random or block copolymer having regular or random recurring units of the following formulae VIII–XIV:

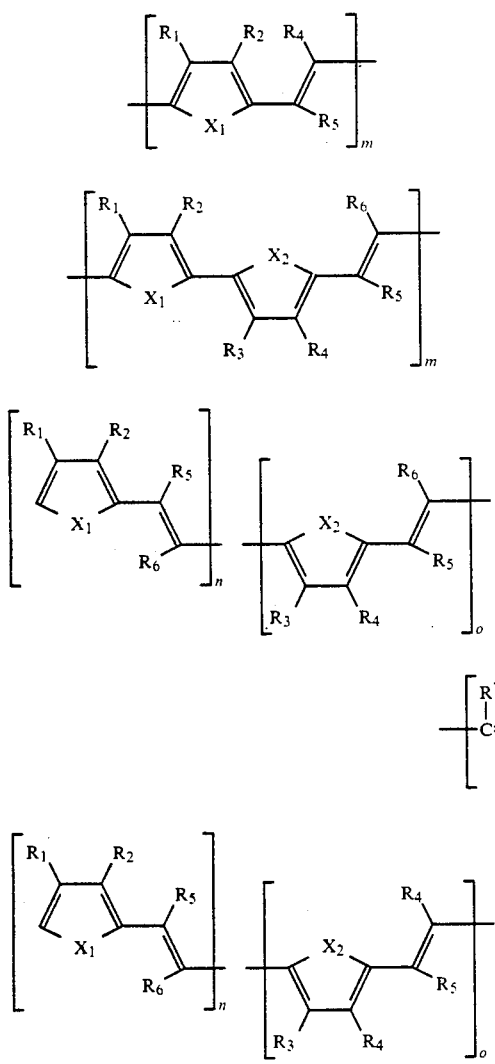

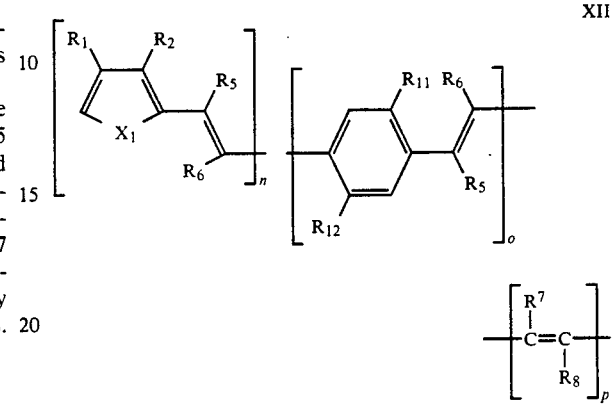

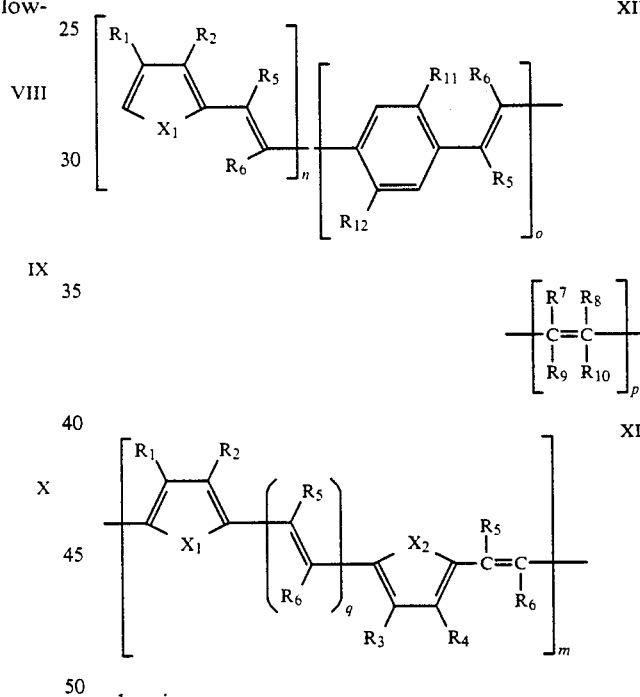

wherein:
m, and the sum of n, o, and p, are the same or different and are greater than about 100; with the proviso that at least one of n or o is greater than zero;
q is an integer which can range from 0 to about 4;
R$_1$, R$_2$, R$_3$, R$_4$, R$_5$, R$_6$, R$_7$, R$_8$, R$_9$, R$_{10}$, R$_{11}$, R$_{12}$, R$_{13}$ and R$_{14}$ are the same or different at each occurence and are hydrogen or isotopes thereof, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, arylamino, diarylamino, alkylamino, dialkylamino, phosphoric acid, alkylarylamino, arylthio, heterocycle, arylsulfinyl, alkoxycarbonyl, arylsulfonyl, carboxylic acid, halogen, nitro, cyano, sulfonic acid, or alkyl or phenyl substituted with one or more of sulfonic acid, phosphoric acid, carboxylic acid, halo, amino, nitro, cyano or epoxy moieties, or a moiety of the formula:

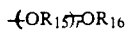

wherein:
R$_{15}$ is a divalent alkylene moiety having from 1 to about 7 carbon atoms;
R$_{16}$ is alkyl having from 1 to about 7 carbon atoms; and
r is a natural number from 1 to about 50;
R$_1$ and R$_2$, or R$_3$ and R$_4$, or R$_5$ and R$_6$, or R$_7$ and R$_8$, or R$_9$ and R$_{10}$, or R$_{11}$ and R$_{12}$, or R$_{13}$ and R$_{14}$ substituents taken together are an alkylene or alkenylene group completing a 4, 4, 5, 6 or 7 membered aromatic or alicyclic carbon ring, or taken together are an alkylene or alkenylene group completing a 3, 4, 5, 6 or 7 membered aromatic or alicyclic carbon ring which includes one or more divalent heteroatoms of nitrogen, sulfur, sulfinyl, sulfonyl or oxygen; and
X$_1$ and X$_2$ are the same or different and are S, O, Se, NR$_{17}$, or PR$_{17}$, wherein R$_{17}$ is hydrogen, alkylaryl, arylalkyl, alkyl or aryl.

2. A polymer according to claim 1 wherein:
R$_1$ to R$_4$ are the same or different at each occurence and are hydrogen; alkyl containing from 1 to about 20 carbon atoms; phenyl; alkenyl containing from 2 to about 20 carbon atoms; alkylphenyl or phenylalkyl each containing from about 7 to about 20 carbons atoms; alkylthio or alkoxy each containing from 1 to about 20 carbon atoms; alkylamino, dialkylamino, dialkylamino, arylamino and alkylarylamino; alkoxyalkyl having from 2 to about 20 carbon atoms; substituted phenyl or substituted alkyl having from 1 to about 20 carbon atoms wherein permissible substitutents are epoxy, nitro, cyano, amino, sulfonic acid, phosphoric acid, carboxylic acid or halo groups; moiety of the formula:

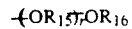

wherein:
R$_{15}$ is alkyl having from 1 to about 4 carbon atoms;
R$_{16}$ alkyl having from 1 to about 4 carbon atoms; and
r is a natural number from 1 to about 25; or any of R$_1$ and R$_2$, or R$_3$ and R$_4$ substituents taken together may form an alkylene or alkenylene chain having from 2 to 20 carbon atoms completing a 4, 5 or 6 membered ring system which may include one or more heteroatoms of divalent oxygen or sulfur;
R$_5$ to R$_{12}$ are the same or different at each occurrence and are hydrogen, substituted or unsubstituted alkyl having from 1 to about 12 carbon atoms, substituted or unsubstituted phenyl, or alkylthio or alkoxy each having from 1 to about 12 carbon atoms; or any of R$_5$ and R$_6$, or R$_7$ and R$_8$, or R$_9$ and R$_{10}$ or R$_{11}$ and R$_{12}$ substituents taken together may form an alkylene chain having 2 to about 20 carbon atoms completing a 4, 5 or 6 membered ring system which may include one or more heteroatoms of oxygen, nitrogen or sulfur; and
X$_1$ and X$_2$ are the same or different and are divalent oxygen, sulfur or NR$_{15}$ wherein R$_{15}$ is hydrogen or alkyl.

3. A polymer according to claim 2 wherein:
R$_1$, R$_2$, R$_3$, and R$_4$ are the same or different at each occurrence and are hydrogen, alkoxyalkyl, alkoxy, alkythio or alkyl, or

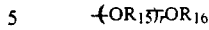

wherein:
R$_{15}$ is alkylene of about 2 to 3 carbon atoms;
R$_{16}$ is alkyl of from 1 to about 3 carbon atoms; and
r is a natural number from 1 to about 10.

4. A polymer according to claim 3 wherein R$_1$, R$_2$, R$_3$ and R$_4$ are hydrogen.

5. A polymer according to claim 3 wherein R$_1$, R$_2$, R$_3$ and R$_4$ are the same or different and are hydrogen, alkyl, alkoxy alkoxyalkyl or

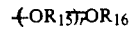

wherein:
R$_{15}$ is alkylene of about 2 to 3 carbon atoms;
R$_{16}$ is alkyl of from 1 to about 3 carbon atoms; and
r is a natural number from 1 to about 10.

6. A polymer according to claim 3 wherein no more than about two of R$_1$, R$_2$, R$_3$ or R$_4$ is alkyl, alkoxy or alkoxyalkyl or

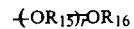

wherein:
R$_{15}$ is alkylene of about 2 to 3 carbon atoms;
R$_{16}$ is alkyl of from 1 to about 3 carbon atoms; and
r is a natural number from 1 to about 10.

7. A polymer according to claim 3 wherein
R$_1$ is alkoxy or alkyl having 1 to about 12 carbon atoms, alkoxyalkyl having from 2 to about 12 carbon atoms or a moiety of the formula:

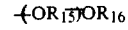

wherein:
R$_{15}$ is —(CH$_2$)$_2$ or —CH$_2$CH(CH$_3$)—;
R$_{16}$ is —CH$_3$ or —CH$_2$CH$_3$; and
r is a natural number 1 to about 6;
R$_3$ is hydrogen or alkyl having 1 to about 12 carbon atoms; and
R$_2$ and R$_4$ are hydrogen.

8. A polymer according to claim 3 wherein X$_1$ and X$_2$ are sulfur.

9. A polymer according to claim 74 wherein:
R$_1$ is alkyl and;
R$_3$ is alkyl having from 1 to about 12 carbon atoms.

10. A polymer according to claim 7 wherein:
R$_1$ is alkoxy; and
R$_3$ is hydrogen.

11. A polymer according to claim 1 wherein R$_5$ to R$_{12}$ are the same or different at each occurrence and are hydrogen or alkyl having from 1 to about 12 carbon atoms.

12. A polymer according to claim 9 wherein at least one of R$_5$ to R$_{12}$ are h 13. A polymer of claim 2 wherein X$_1$, or X$_2$ is NR$_{17}$.

14. A polymer according to claim 13 wherein X and X$_2$ are NR$_{17}$, wherein R$_{17}$ hydrogen or alkyl from about 1 to about 12 carbon atoms, phenyl or alkylphenyl of about 6 to about 12 carbon atoms, being the same or different at each occurrence.

15. A polymer according to claim 1 wherein m and the sum of n, o, and p are the same or different and are greater than about 200 with the proviso that the moles of each regular or random recurring moiety in the block or random copolymer of Formulas X, XI, XII and XIII is at least about 1 mole % based on the total moles or recurring units.

16. A polymer according to claim 15 is wherein m, and the sum of n, o, and p are the same or different and are greater than about 500 with the proviso that the moles of each regular or random recurring moiety in the block or random copolymer of Formulas X, XI, XII and XIII is at least about 5 mole % based on the total moles or recurring units.

17. A polymer of claim 1 having recurring units of the formula:

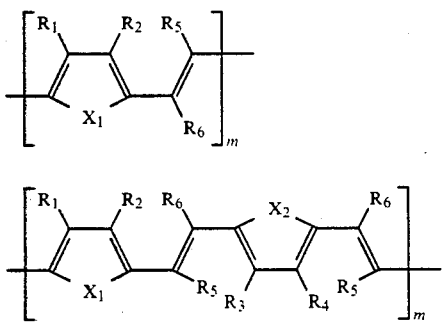

18. A polymer according to claim 17 wherein:
$R_1$, $R_2$, $R_3$ and $R_4$ are the same or different at each occurence and are hydrogen, alkyl or alkoxy with the proviso that at least one of $R_1$, $R_2$, $R_3$ or $R_4$ is alkoxy or alkyl;
$X_1$ and $X_2$ are the same or different and are O, S or —NH—; and
$R_5$ and $R_6$ are hydrogen or alkyl.

19. A polymer according to claim 18 wherein $R_1$, $R_2$, $R_3$ and $R_4$ are hydrogen or alkoxy with the proviso that at least one of $R_1$, $R_2$, $R_3$ or $R_4$ is alkoxy.

20. A polymer according to claim 19 wherein $X_1$ and $X_2$ are sulfur.

21. A polymer according to claim 18 wherein m, and the sum of n, o and p are greater than about 200.

22. A polymer according to claim 18 wherein the polymer is poly(3-methoxy-2,5-thienylene vinylene).

23. A polymer according to claim 18 wherein $R_1$, $R_2$, $R_3$, and $R_4$ are hydrogen or alkyl.

24. A polymer according to claim 23 wherein $X_1$ and $X_2$ are sulfur.

25. A polymer according to claim 24 selected from the group consisting of poly(3-butyl-2,5-thienylene vinylene) and poly(3-propyl-2,5-thienylene vinylene).

26. A polymer of claim 13 wherein
m is a natural number equal to or greater than about 200;
$R_1$, $R_2$, $R_3$ and $R_4$ are the same or different at each occurrence and are hydrogen, or alkyl or alkoxy having from 1 to about 12 carbons;
$X_1$ and $X_2$ are sulfur; and
$R_5$ and $R_6$ are the same or different at each occurrence and are hydrogen or alkyl having from 1 to about 12 carbons.

27. A polymer according to claim 17 wherein m is equal to or greater than about 500.

28. A polymer according to claim 17 wherein $R_5$ and $R_6$ are hydrogen.

29. A polymer according to claim 17 wherein $R_1$, $R_2$, $R_3$, and $R_4$ are hydrogen.

30. A polymer according to claim 17 wherein no more than about two of $R_1$, $R_2$, $R_3$ and $R_4$ are alkyl, alkoxy, alkoxyalkyl or moiety of the formula:

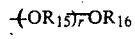

wherein
$R_{15}$ is alkyl having from 1 to about 4 carbon atoms;
$R_{16}$ alkyl having from 1 to about 4 carbon atoms; and
r is a natural number from 1 to about 25.

31. A polymer according to claim 17 wherein
$R_1$ is alkoxy or alkyl having from 1 to about carbon atoms; alkoxyalkyl having from 2 to about 12 carbon atoms and

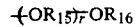

wherein:
$R_{15}$ is alkylene of about 2 to 3 carbon atoms; $R_{16}$ is alkyl of from 1 to about 3 carbon atoms; and
r is a natural number from 1 to about 10;
$R_3$ is hydrogen or alkyl having from 1 to about carbon atoms; and
$R_2$ and $R_4$ are hydrogen.

32. A polymer according to claim 31 wherein $R_3$ is hydrogen.

33. A polymer according to claim 30 wherein $R_1$ is alkoxy.

34. A polymer according to claim 31 wherein $R_1$ is alkyl.

35. Polymer according to claim 17 wherein $X_1$ and $x_2$ are $NR_{17}$.

36. Polymer according to claim 17 wherein $X_1$, or $X_2$ is $NR_{17}$ where $R_{17}$ is the same or different at each occurrence and is hydrogen, alkyl from about 1 to about 12 carbon atoms, aryl or alkylaryl of about 6 to about 12 carbon atoms.

37. A polymer according to claim 17 selected from the group consisting of poly(2,5-thienylene vinylene); poly (methoxy-2,5-thienylene vinylene); poly(3-butylene-2,5-thienylene vinylene); poly(3-butyl-2,5-thienylene-CO-3-methyl-2,5-thienylene vinylene); poly(2,5-furylene vinylene); poly(3-propyl-2,5-thienylene vinylene); C)-2,5-thienylene vinylene/2,5-furylene vinylene; CO-2,5-thienylene vinylene/1,4-dimethoxy-2-vinylene benzene; and poly(2-ethoxy-2,5-thienylene vinylene).

38. A polymer according to claim 1 wherein m and the sum of n, o and p are natrual numbers.

39. A polymer according to claim 38 wherein n, o and p are selected such that the amount of each monomeric recurring moiety is at least about 1 mole % based on the total moles of recurring units.

40. A polymer according to claim 39 wherein said amount if equal to or greater than about 5 mole %.

41. A polymer according to claim 40 wherein said amount is equal to or greater than about 10 mole %.

42. A polymer according to claim 1 wherein said polymer is a random copolymer.

43. A homopolymer or random or block copolymer having regular or random recurring units of the following formulas VIII–XIV:

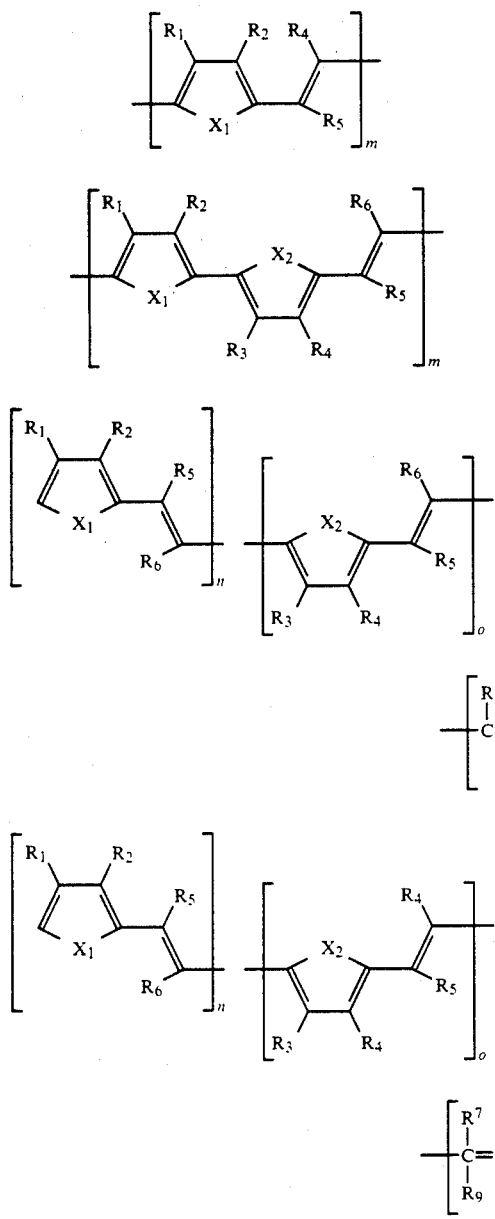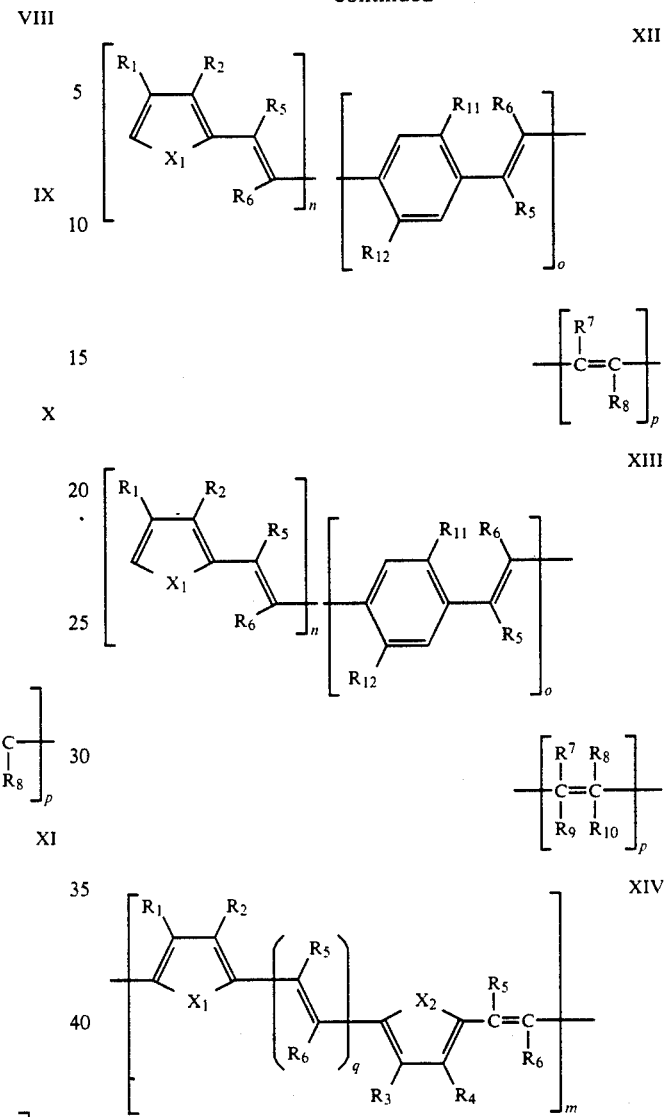
prepared by heating or by contacting with base the corresponding homopolymer or random or block copolymer having regular or random recurring units of the following formulae I to VII:
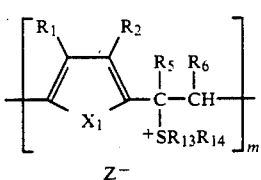
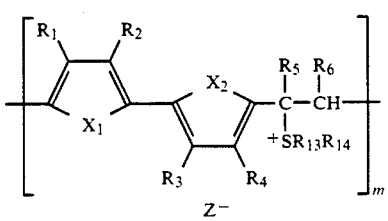

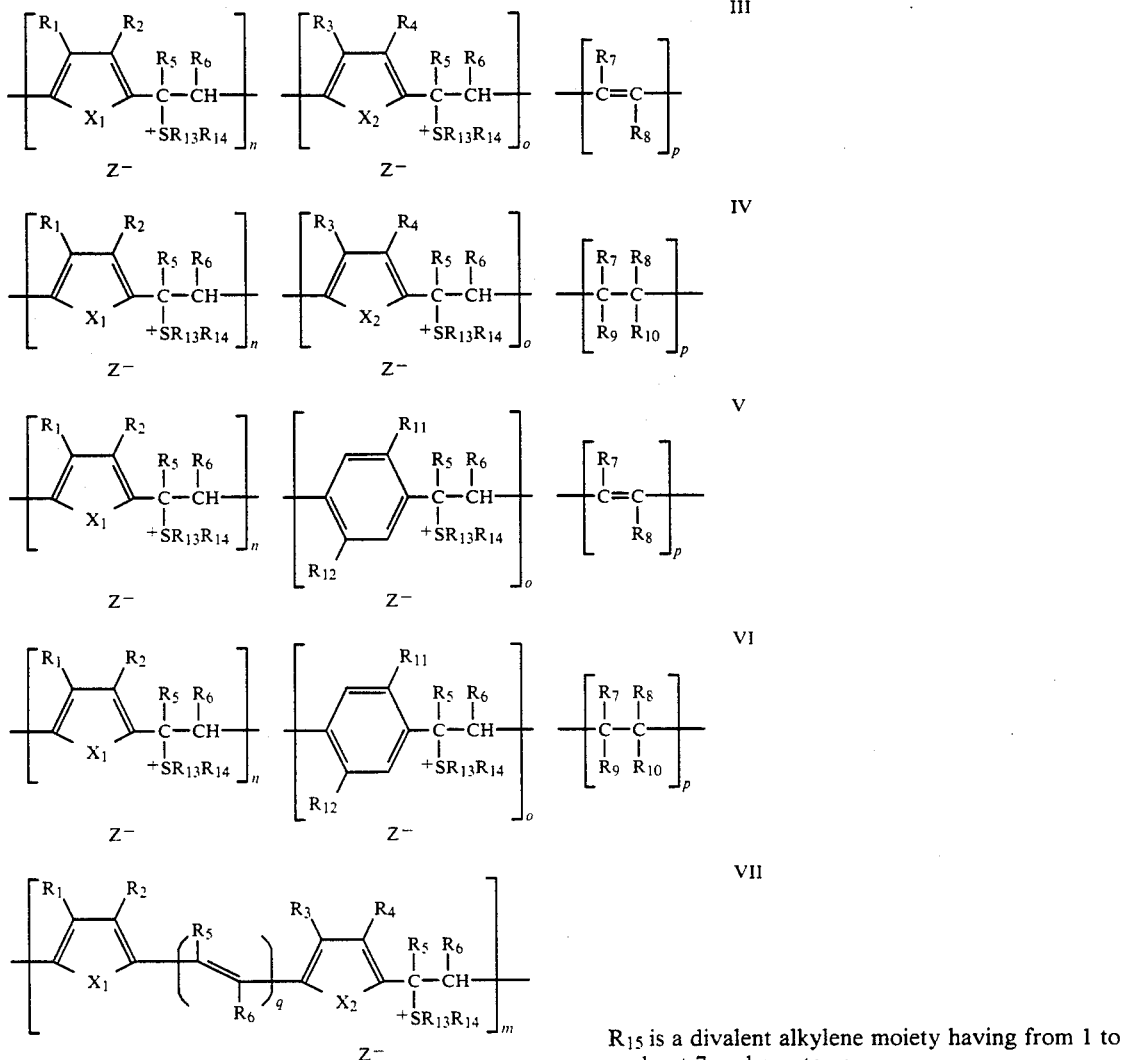

to eliminate species of the formulas:

$$HZ \text{ and } SR_{13}R_{14}$$

wherein:

m, and the sum of n, o, p, and q are the same or different and are at least about 100 with the proviso that at least one of n or o is greater than zero;

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different at each occurence and are hydrogen or isotopes thereof, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, arylamino, diarylamino, alkylamino, dialkylamino, phosphoric acid, alkylarylamino, arylthio, heteroaryl, arylsulfinyl, alkoxycarbonyl, arylsulfonyl, carboxylic acid, halogen, nitro, cyano, sulfonic acid, or alkyl or phenyl substituted with one or more of sulfonic acid, phosphoric acid, carboxylic acid, halo, amino, nitro, cyano or epoxy moieties, or a moiety of the formula:

$$\pm(OR_{15})_r OR_{16};$$

wherein:

$R_{15}$ is a divalent alkylene moiety having from 1 to about 7 carbon atoms;

$R_{16}$ is alkyl having from 1 to about 7 carbon atoms; and r is a natural number from 1 to about 50;

$R_1$ and $R_2$, or $R_3$ and $R_4$, or $R_5$ and $R_6$, or $R_7$ and $R_8$, or $R_9$ and $R_{10}$, or $R_{11}$ and $R_{12}$, or $R_{13}$ and $R_{14}$, or $R_{15}$ and $R_{16}$ substituents taken together are an alkylene or alkenylene group completing a 3, 4, 5, 6 or 7 membered aromatic or alicyclic carbon ring, or taken together are an alkylene or alkenylene group completing a 3, 4, 5, 6 or 7 membered aromatic or alicyclic carbon ring which includes one or more divalent heteroatoms of nitrogen, sulfur, sulfinyl, sulfonyl or oxygen; Z is an anion; and $X_1$ and $X_2$ are the same or different and are divalent S, O, Se, $NR_{17}$ or $PR_{17}$, wherein $R_{17}$ is hydrogen, alkyl alkylaryl, arylalkyl, or aryl.

44. A homopolymer or copolymer according to claim 41 formed by the thermal elimination of species of the formulas HZ and $SR_{13}R_{14}$.

45. A homopolymer or copolymer according to claim 41 formed by the chemical elimination of the species of the formulas HZ and $SR_{13}R_{14}$.

46. A homopolymer or copolymer according to claim 45 wherein said species are chemically eliminated by treating a homopolymer or copolymer having recurring units of the Formulas I to VII with a base.

* * * * *